US012482365B2

(12) United States Patent
Kim

(10) Patent No.: US 12,482,365 B2
(45) Date of Patent: Nov. 25, 2025

(54) AUTOMATED UAV OPEN WATER BEACHFRONT HAZARD RECOGNITION, WARNING, AND RESCUE SYSTEM AND PROCESSES

(71) Applicant: Angelina Yejin Kim, Del Mar, CA (US)

(72) Inventor: Angelina Yejin Kim, Del Mar, CA (US)

( * ) Notice: Subject to any disclaimer, the term of this patent is extended or adjusted under 35 U.S.C. 154(b) by 105 days.

(21) Appl. No.: 18/401,269

(22) Filed: Dec. 29, 2023

(65) Prior Publication Data

US 2025/0218301 A1 Jul. 3, 2025

(51) Int. Cl.
  *G08G 5/55* (2025.01)
  *B64U 10/10* (2023.01)
  *B64U 101/57* (2023.01)
  *G06V 20/17* (2022.01)
  *G08G 5/34* (2025.01)
  *G08G 5/57* (2025.01)

(52) U.S. Cl.
  CPC .............. *G08G 5/55* (2025.01); *B64U 10/10* (2023.01); *G06V 20/17* (2022.01); *G08G 5/34* (2025.01); *G08G 5/57* (2025.01); *B64U 2101/57* (2023.01); *B64U 2201/10* (2023.01)

(58) Field of Classification Search
  CPC ... G08G 5/55; G08G 5/34; G08G 5/57; B64U 10/10; B64U 2101/57; B64U 2201/10; G06V 20/17
  See application file for complete search history.

(56) References Cited

U.S. PATENT DOCUMENTS

| 2003/0090391 A1* | 5/2003 | Philiben | ................ | A01M 29/10 340/471 |
| 2015/0094883 A1* | 4/2015 | Peeters | .................. | G01C 21/20 701/3 |

FOREIGN PATENT DOCUMENTS

GB         2608614       * 11/2023

* cited by examiner

*Primary Examiner* — Alan D Hutchinson
(74) *Attorney, Agent, or Firm* — Plager Schack LLP; Mark H. Plager; Stephen Hallberg

(57) ABSTRACT

An automated unmanned aerial vehicle (UAV) open water beachfront hazard recognition, warning, and rescue system and processes are disclosed. The automated UAV open water beachfront hazard recognition, warning, and rescue system includes a UAV that is configured as an autonomous patrol or scout system, an automated rip current and sea animal registration system, and a mechanical rescue system to pull out or support a person in water. The automated UAV open water beachfront hazard recognition, warning, and rescue system is configured to react quickly and reach targets fast because the UAV flies in the air and takes a direct, obstruction-free path to the target.

16 Claims, 11 Drawing Sheets

AUTOMATED UAV OPEN WATER BEACHFRONT HAZARD RECOGNITION, WARNING, AND RESCUE SYSTEM AND PROCESSES

BACKGROUND

Embodiments of the invention described in this specification relate generally to beach and ocean safety from rip currents and ocean predators, and more particularly, to an automated UAV open water beachfront hazard recognition, warning, and rescue system and processes.

People who enjoy beaches and water sports in the ocean have strong needs for safety from both rip currents and ocean predators. This is why most public beaches employ lifeguards to monitor beach-goers and dangers that may arise. However, fatalities and injuries still occur on a regular enough basis that lifeguards alone are not the only solution. In fact, many fatalities and injuries are caused by rip currents (also referred to as "riptides") and/or ocean predators when lifeguards are absent, or because lifeguards may react with delay or indecision. Sometimes, lifeguards do not notice the emergency at all, possibly because they are preoccupied with other tasks. Among those tasks, some lifeguards perform duties that involve monitoring and controlling of manually operated unmanned aerial vehicles (UAVs). According to US Lifesaving Association data, sixty-three of sixty-eight surf zone fatalities have occurred due to rip currents in year 2022. Furthermore, there has been a recent increase in shark and sea animal attacks. One proposed solution, as noted above, was to have lifeguards manually operate UAVs to monitor the shore and identify potential threats, and to warn people at the beach and in the water. Manually operated UAVs can be a useful tool for lifeguards. However, lifeguards who are busy manually operating UAVs may fail to notice dangers or an ongoing emergency at all, simply due to their attention being distracted by the mechanics of operating the UAV.

While some UAVs are autonomous in operation, there are no existing systems that employ autonomous UAVs for ocean identification of rip currents and ocean animals, such as sharks. Additionally, none of the existing autonomous UAVs or systems provide automated rescue ocean/beach procedures. This is unfortunate since lifeguards may not see potential threats promptly or may not react quickly enough because of their limited line of sight and visibility distance. Also, rescue procedures may require lifeguards to swim into the ocean or utilize a boat to reach a person in distress or in relative proximity to a dangerous ocean predator. As currently seen across beaches everywhere, lifeguard towers are a normal fixture located on the beach. However, the tower only provides a limited view and it can be difficult for lifeguards to identify rip currents, distressed swimmers, or ocean animals as distance and waves hinder their sight of the ocean. Additionally, lifeguards are humans who are capable of human mistakes. For example, lifeguards can get distracted or lose their attention span. Lifeguards may also lack visibility due to obstructions (e.g., by other closer objects in their field of view such as waves and swimmers) or have diminished visual acuity after exposure to the sun (e.g., fatigued eyes from bright sun rays). Rip currents and sea animals also can shift position over time, meaning that constant monitoring is required, either by a lifeguard or UAV.

Overall, human lifeguards are always at risk of reacting too slowly to emergency situations or making (human) mistakes in identifying dangers. Warnings for danger can be slow, and systems put in place to save people in danger can be inefficient. Being slow in identifying dangers and issuing warnings is incredibly dangerous because of the risks of injury or death. Usually, a rescue lifeguard should reach a victim within ninety seconds after the distress. The existing conventional UAV-related systems have not incorporated ways to identify rip currents automatically through AI and learning, and to repel ocean animals or methods to save people in danger to reduce fatalities, whether it be from rip currents or sea animals. They also have not been strong enough to move a person in the ocean. As such, the conventional systems and techniques have relied on manual detection and piloting done by lifeguards or officials, taking up their undivided attention as they try to identify threats from the UAV's camera.

Therefore, what is needed is a way to monitor beaches and ocean shorelines for hazards, such as rip currents, sea animals including ocean predators, and other marine hazards such as high crashing waves, etc., which lifeguards typically monitor manually, and provide warnings and rescue operations when hazards are detected.

BRIEF DESCRIPTION

Some embodiments of the invention include a novel automated UAV open water beachfront hazard recognition, warning, and rescue system and processes are disclosed. In some embodiments, the automated UAV open water beachfront hazard recognition, warning, and rescue system includes an unmanned aerial vehicle (UAV) that is configured as an autonomous patrol or scout system, an automated rip current and sea animal registration system, and a mechanical rescue system to pull out or support a person in water. In some embodiments, the automated UAV open water beachfront hazard recognition, warning, and rescue system is configured to react quickly and reach targets fast because the UAV flies in the air and takes a direct, obstruction-free path to the target.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
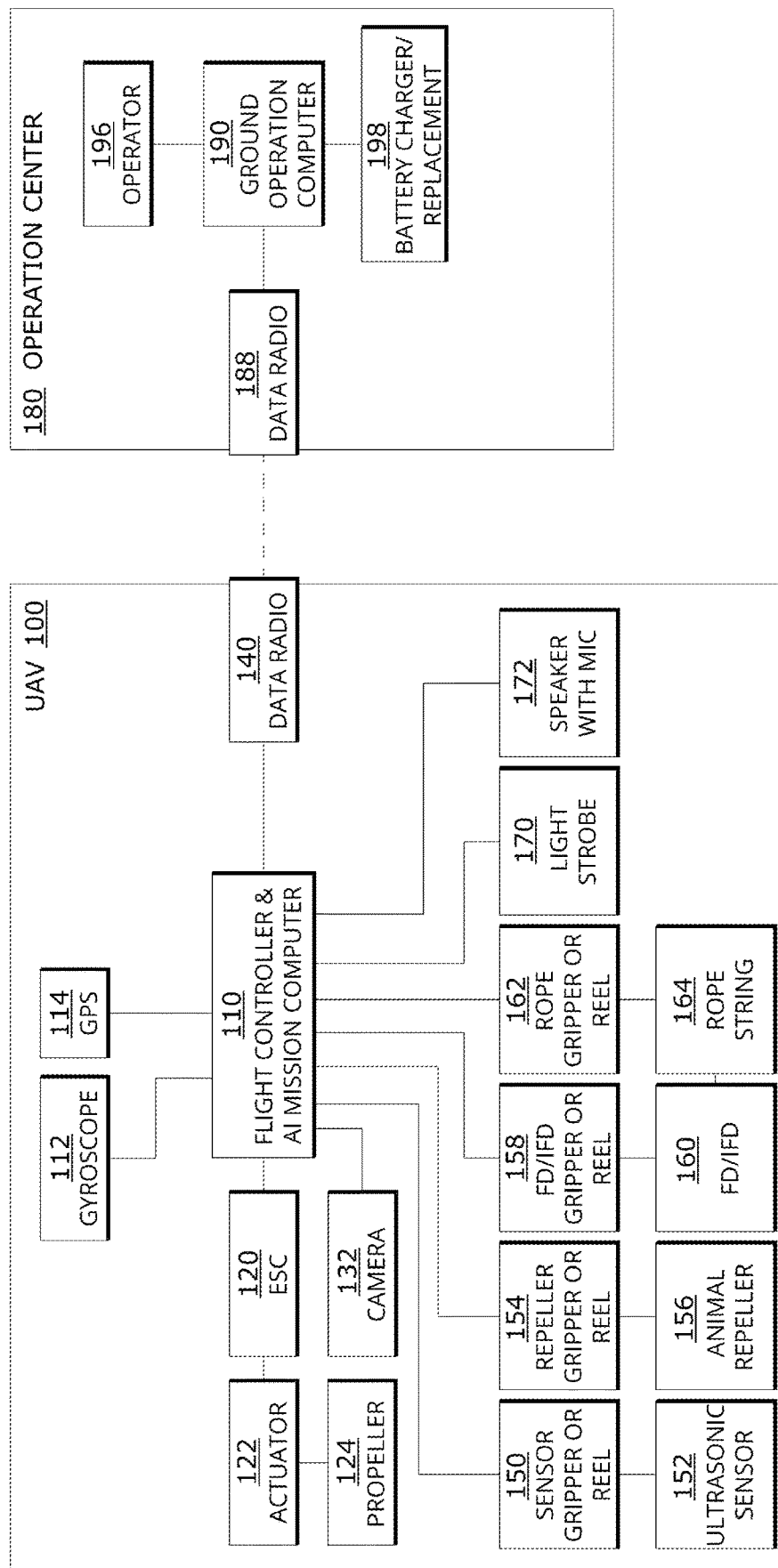
FIG. 1 conceptually illustrates an automated UAV open water beachfront hazard recognition, warning, and rescue system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel automated UAV open water beachfront hazard recognition, warning, and rescue system and processes are disclosed. In some embodiments, the automated UAV open water beachfront hazard recognition, warning, and rescue system includes an unmanned aerial vehicle (UAV) that is configured as an autonomous patrol or scout system, an automated rip current and sea animal registration system, and a mechanical rescue system to pull out or support a person in water. In some embodiments, the automated UAV open water beachfront hazard recognition, warning, and rescue system is configured to react quickly and reach targets fast because the UAV flies in the air and takes a direct, obstruction-free path to the target.

In this specification, the term "beachfront" means the beach and ocean/sea water area (or "open water area") under lifeguard purview, from the tide-varying shoreline extending out to a seaward boundary beyond which human beach goers are not permitted or typically do not cross.

As stated above, people who enjoy beaches and water sports in the ocean have strong needs for safety from both rip currents and ocean predators. This is why most public beaches employ lifeguards to monitor beach-goers and dangers that may arise. However, fatalities and injuries still occur on a regular enough basis that lifeguards along are not the only solution. In fact, many fatalities and injuries are caused by rip currents and/or ocean predators when lifeguards are absent, or because lifeguards may react with delay or indecision. Sometimes, lifeguards do not notice the emergency at all, possibly because they are preoccupied with other tasks. Among those tasks, some lifeguards perform duties that involve monitoring and controlling of manually operated UAVs. According to US Lifesaving Association data, sixty-three of sixty-eight surf zone fatalities have occurred due to rip currents in year 2022. Furthermore, there has been a recent increase in shark and sea animal attacks. One proposed solution, as noted above, was to have lifeguards manually operate UAVs to monitor the shore and identify potential threats, and to warn people at the beach and in the water. Manually operated UAVs can be a useful tool for lifeguards. However, lifeguards who are busy manually operating UAVs may fail to notice dangers or an ongoing emergency at all, simply due to their attention being distracted by the mechanics of operating the UAV. While some UAVs are autonomous in operation, there are no existing systems that employ autonomous UAVs for ocean identification of rip currents and ocean animals, such as sharks. Additionally, none of the existing autonomous UAVs or systems provide automated rescue ocean/beach procedures. This is unfortunate since lifeguards may not see potential threats promptly or may not react quickly enough because of their limited line of sight and visibility distance. Also, rescue procedures may require lifeguards to swim into the ocean or utilize a boat to reach a person in distress or in relative proximity to a dangerous ocean predator. As currently seen across beaches everywhere, lifeguard towers are a normal fixture located on the beach. However, the tower only provides a limited view and it can be difficult for lifeguards to identify rip currents, distressed swimmers, or ocean animals as distance and waves hinder their sight of the ocean. Additionally, lifeguards are humans who are capable of human mistakes. For example, lifeguards can get distracted or lose their attention span. Lifeguards may also lack visibility due to obstructions (e.g., by other closer objects in their field of view such as waves and swimmers) or have diminished visual acuity after exposure to the sun (e.g., fatigued eyes from bright sun rays). Rip currents and sea animals also can shift position over time, meaning that constant monitoring is required, either by a lifeguard or UAV. Overall, human lifeguards are always at risk of reacting too slowly to emergency situations or making (human) mistakes in identifying dangers. Warnings for danger can be slow, and systems put in place to save people in danger can be inefficient. Being slow in identifying dangers and issuing warnings is incredibly dangerous because of the risks of injury or death. Usually, a rescue lifeguard should reach a victim within ninety seconds after the distress. The existing conventional UAV-related systems have not incorporated ways to identify rip currents automatically through AI and learning, and to repel ocean animals or methods to save people in danger to reduce fatalities, whether it be from rip currents or sea animals. They also have not been strong enough to move a person in the ocean. As such, the conventional systems and techniques have relied on manual detection and piloting done by lifeguards or officials, taking up their undivided attention as they try to identify threats from the UAV's camera.

Embodiments of the automated UAV open water beachfront hazard recognition, warning, and rescue system and processes described in this specification overcome many of the problems faced by human lifeguards. For example, a rip current is a common hazard that arises at many beachfront areas but human lifeguards face the same danger as regular swimmers, beach goers, etc. Consequently, it is dangerous for a human lifeguard to go near a rip current. By contrast, the automated UAV open water beachfront hazard recognition, warning, and rescue system is deployed for automated UAV operation. Since the UAV is an aerial vehicle and not a human, the UAV can assist/rescue a person caught in a rip current in ways that human lifeguards cannot. Similarly, it is generally considered too dangerous for a lifeguard to go near a sea animal, especially an ocean predator. This makes it hard for the lifeguard to deter the sea animal in any meaningful way. By contrast, the UAV of the automated UAV open water beachfront hazard recognition, warning, and rescue system can assist in deterring the sea animal by way of its various sea animal repelling actuators or sensors. Furthermore, if a human is in danger of the sea animal, the UAV can assist them by dropping a floatation device (FD) or an inflatable floatation device (IFD) and dragging them to the shore while also performing its sea animal repelling functions. In situations with limited visibility or other view blockage (e.g., by wave and horizontal resolution), the UAV of the automated UAV open water beachfront hazard recognition, warning, and rescue system can overcome the view blockage to which lifeguards are inherently prone due to the fact that human lifeguards only have limited vertical access, while their view of the ocean is horizontally oriented from the shoreline, the beach, or (at best) the lifeguard tower. By contrast, the UAV of the automated UAV open water beachfront hazard recognition, warning, and rescue system is configured to automatically and independently fly over the entire beachfront area (including the beach, the shoreline, the ocean water, etc., and extending out to the greater sea) and scan the beachfront area with a birds-eye view, looking to identify rip currents, dangerous waves, strong undertow, sea animals, and other ocean hazards in and around the open water and shoreline. Thus, the UAV is able to exceed the limited visibility at the water surface level and probe under the water for ocean predators, etc., and is also capable of covering long distances quickly with its flight. Thus, the UAV is able to aerially navigate to any of several different beachfront areas (horizontally, in distance/depth, vertically above and below sea level, etc.) in a series of motions to analyze as much ocean surface area as possible without straying too far from a center of operations. In some embodiments, the center of operations is at a Lifeguard Operation Center (LOC). In some embodiments, the LOC provides battery replacement and/or charging stations for the UAV of the automated UAV open water beachfront hazard recognition, warning, and rescue system. Additionally, the automated UAV open water beachfront hazard recognition, warning, and rescue system supports deployment of multiple UAVs and concurrent operation of those UAVs. When multiple UAVs are operationally deployed, the automated UAV open water beachfront hazard recognition, warning, and rescue system provides a greater range of supervision, especially when compared to manual UAVs that require a dedicated lifeguard to constantly monitor each manual UAV.

Embodiments of the automated UAV open water beachfront hazard recognition, warning, and rescue system described in this specification differ from and improve upon previous and currently existing manually-controlled UAV systems and the conventional beachfront safety, lifeguarding, and ocean rescue practices. In particular, previous and existing UAV systems to monitor the beachfront area of the ocean do not provide coordinated systems such as an autonomous patrol system or mechanical rescue system (to drag out or support a person in water). While the manually-controlled UAVs can be used to identify sea creatures and hazards (e.g., identify sharks near the swimming/surfing areas of the beachfront), the problem is that it requires a human operator—specifically, a lifeguard—to operate the manual UAV at the lifeguard tower and identify potential threats with human eyes or drop life tubes manually. Human pilots of manual UAVs can miss emergencies or misidentify them. Additionally, any given operator may not be experienced or may have a short attention span. These factors put lives at risk. Furthermore, requiring a lifeguard to manually operate the UAV ties up the lifeguard from traditional functions of broadly monitoring the entire beachfront (which may extend out into the ocean quite a distance for surfers) and the potentially long coastline (which may be wide and expansive), resulting in at least a diversion of their attention. By contrast, the automated UAV open water beachfront hazard recognition, warning, and rescue system provides a fully automated UAV-based system that is configured to automatically monitor the beachfront for hazards and, when a hazard is identified, carry out safety measures in real time and almost instantaneously. In addition to being automated, the UAV drone flies unobstructed to its target, since the pathway for the UAV is through the air. While manually-operated UAVs also can fly unobstructed to a target location, the automated UAV open water beachfront hazard recognition, warning, and rescue system provides a mechanical rescue system that would normally need to be the responsibility of the human lifeguard. One of the benefits of the automated UAV open water beachfront hazard recognition, warning, and rescue system is that it incorporates artificial intelligence (AI) processing to identify hazards. This differs substantially from the current practices which require human lifeguards to identify rip curls, crashing waves, and sea animals, which is difficult at best. Although there are some AI programs that have been developed which use different sensors to identify rip currents from fixed observation posts, none of the existing AI programs for rip current identification are utilized for UAV operation over the beachfront area (including beach and water area near beach) to identify ocean hazards such as rip currents, sea animals, or other dangers that put persons in perilous situations in the water.

The automated UAV open water beachfront hazard recognition, warning, and rescue system of the present disclosure may be comprised of the following elements. This list of possible constituent elements is intended to be exemplary only and it is not intended that this list be used to limit the automated UAV open water beachfront hazard recognition, warning, and rescue system of the present application to just these elements. Persons having ordinary skill in the art relevant to the present disclosure may understand there to be equivalent elements that may be substituted within the present disclosure without changing the essential function or operation of the automated UAV open water beachfront hazard recognition, warning, and rescue system.

1. An unmanned aerial vehicle (UAV).
2. An operation center or lifeguard operation center (LOC).

By way of example, FIG. 1 conceptually illustrates an automated UAV open water beachfront hazard recognition, warning, and rescue system. As shown in this figure, the automated UAV open water beachfront hazard recognition, warning, and rescue system comprises a UAV 100 and an operation center 180.

The UAV 100 comprises a flight controller & AI mission computer 110, a gyroscope 112, a GPS receiver 114, an electronic speed controller (ESC) 120, a thrust and flight actuator 122 (or motor 122), a propeller 124, a camera 132, a video/network/data/audio data radio 140, a sensor connector 150, an ultrasonic sensor 152, a repeller connector 154, an animal repeller device 156, a floatation device or inflatable floatation device (FD/IFD) connector 158, an FD/IFD 160, a rope connector 162, a rope 164, a light strobe 170, and a speaker with microphone 172.

In some embodiments, the sensor connector 150 comprises a gripper connector assembly. In some embodiments, the sensor connector 150 comprises a reel connector assembly.

In some embodiments, the repeller connector 154 comprises a gripper connector assembly. In some embodiments, the repeller connector 154 comprises a reel connector assembly.

In some embodiments, the FD/IFD connector 158 comprises a gripper connector assembly. In some embodiments, the FD/IFD connector 158 comprises a reel connector assembly.

In some embodiments, the rope connector 162 comprises a gripper connector assembly. In some embodiments, the rope connector 162 comprises a reel connector assembly.

In some embodiments, the gripper connector assembly comprises a gripper assembly base, an actuator, and gripper claws. A device that is attached to a rope which is connected to the gripper assembly base can be held by the gripper connector assembly when the gripper claws are closed. The device can be released from the gripper connector assembly by opening the gripper claws. This allows the device to fall as far as the length of the rope. An example of a gripper connector assembly is described below, by reference to FIG. 10.

In some embodiments, the reel connector assembly comprises a reel assembly base, a motor, a belt, and a reel. A device that is attached to a rope which is connected to the reel can be retracted and held by the reel connector assembly by the motor actuating the reel rotation of the reel to wind up the rope to which the device is attached. The device can be released by the motor actuating the reel to rotate in a way that releases the rope to which the device is attached. An exemplary reel connector assembly is described below, by reference to FIG. 11.

In some embodiments, the UAV 100 comprises a plurality of parallel connected gyroscopes 112. In some embodiments, the plurality of parallel connected gyroscopes 112 comprises the gyroscope 112 and one or more additional gyroscope(s). In some embodiments, the plurality of parallel connected gyroscopes 112 connect individually and in parallel to the flight controller & AI mission computer 110.

In some embodiments, the UAV 100 comprises a plurality of parallel connected GPS receivers 114. In some embodiments, the plurality of parallel connected GPS receivers 114 comprises the GPS receiver 114 and one or more additional GPS receiver(s). In some embodiments, the plurality of parallel connected GPS receivers 114 connect individually and in parallel to the flight controller & AI mission computer 110. In some embodiments, the plurality of parallel connected GPS receivers 114 provide optimized position accuracy for the UAV 100.

In some embodiments, the UAV 100 comprises a plurality of parallel connected electronic speed controllers (ESCs) 120. In some embodiments, the plurality of parallel connected electronic speed controllers (ESCs) 120 comprises the electronic speed controller (ESC) 120 and one or more additional electronic speed controller(s) 120. In some embodiments, the plurality of parallel connected electronic speed controllers (ESCs) 120 connect individually and in parallel to the flight controller & AI mission computer 110.

In some embodiments, the UAV 100 comprises a plurality of parallel connected thrust and flight actuators 122. In some embodiments, the plurality of parallel connected thrust and flight actuators 122 comprises the thrust and flight actuator 122 and one or more additional thrust and flight actuators 122. In some embodiments, the plurality of parallel connected thrust and flight actuators 122 connect individually and in parallel to the plurality of parallel connected electronic speed controllers (ESCs) 120.

In some embodiments, the UAV 100 comprises a plurality of parallel connected propellers 124. In some embodiments, the plurality of parallel connected propellers 124 comprises the propeller 124 and one or more additional propellers 124. In some embodiments, the plurality of parallel connected propellers 124 connect individually and in parallel to the plurality of parallel connected thrust and flight actuators 122.

In some embodiments, the camera 132 comprises a fixed camera attached to the UAV 100. In some embodiments, the camera 132 comprises a camera gimbal with zoom. In some embodiments, the UAV 100 comprises a plurality of parallel connected cameras 132. In some embodiments, the plurality of parallel connected cameras 132 comprises the camera 132 and one or more additional cameras, image capture devices, or video capture devices. In some embodiments, the plurality of parallel connected cameras 132 connect individually and in parallel to the flight controller & AI mission computer 110.

In some embodiments, the flight controller & AI mission computer 110 comprises an embedded computer with a processing unit (CPU), a memory, a storage, and a graphics processing unit (GPU). In some embodiments, the flight controller provides serial input/output (I/O) for communication with actuators, one or more gyroscope(s) 112, one or more GPS receiver(s) 114, sensors, connectors (grippers, reels), the electronic speed controller (ESC) 120, servo motors, the light strobe 170, and the speaker with microphone 172. In some embodiments, the flight controller maintains feedback controls, such as Proportional, Integral, and Derivative (PID) control, of flight actuators (such as the thrust and flight actuator 122) to maintain flight and maneuver the UAV 100. In some embodiments, the flight controller & AI mission computer 110 controls motor speed of the UAV 100 through the electronic speed controller (ESC) 120. In some embodiments, the AI mission computer is embedded as a component of the flight controller & AI mission computer 110 with a processing unit (CPU), a graphics processing unit (GPU) with parallel processing, an AI engine that implements one or more AI algorithms and machine learning algorithms to provide real time, in-flight AI processing. In some embodiments, the flight controller & AI mission computer 110 provides I/O to a network and the camera 132. In some embodiments, the AI engine receives forwarded image data captured by the camera 132 and analyzes it for danger. The AI engine of the flight controller & AI mission computer 110 then reports the analysis results to the ground operation computer 190 of the operation center 180 via wireless transmission of the data from the video/network/data/audio data radio 140 of the UAV 100 to a ground video/network/data/audio data radio 188 of the operation center 180.

In some embodiments, the video/network/data/audio data radio 140 of the UAV 100 and the ground video/network/data/audio data radio 188 of the operation center 180 are wireless, radio frequency (RF)-based communication radios.

In some embodiments, the sensor connector 150 of the UAV 100 connects the ultrasonic sensor 152 to a sensor actuator. In some embodiments, the sensor connector 150 comprises a sensor gripper. In some embodiments, the sensor connector 150 comprises a sensor reel. In some embodiments, the sensor actuator comprises an ultrasound actuator.

In some embodiments, the repeller connector 154 of the UAV 100 connects the animal repeller device 156 to a repeller device actuator. In some embodiments, the repeller connector 154 comprises an animal repeller gripper. In some embodiments, the repeller connector 154 comprises an animal repeller reel. In some embodiments, the repeller device actuator comprises a magnetic field actuator. In some embodiments, the animal repeller device 156 comprises a strong magnet and a magnetic field sensor.

In some embodiments, the animal repeller device 156 of the UAV 100 comprises an ultrasound actuator to deter sharks, as sharks may be sensitive enough to 'feel' ultrasound. In some embodiments, the animal repeller device 156 comprises a magnetic field actuator to deter sharks, as sharks may be sensitive to or capable of sensing increased/changed magnetic field which may induce a stress response in the shark to move away from the magnetic field. Beyond sharks, the magnetic field actuator and/or the ultrasound actuator may emit sensations that are specific to marine animal species and their preferences or dislikes.

In some embodiments, the FD/IFD connector 158 comprises one of a gripper and a reel. The FD/IFD connector 158 is configured to hold a life-saving rescue floatation device or inflatable floatation device (FD/IFD) 160 while the UAV 100 is in flight. The FD/IFD 160 can be detached from the FD/IFD connector 158 when needed to rescue a human in the water of the beachfront area (e.g., detached and dropped down to the surface of the water).

In some embodiments, the FD/IFD 160 of the UAV 100 is attached to the rope 164. In some embodiments, the FD/IFD 160 is configured to provide a life-saving rescue feature by allowing a floatation device or inflatable floatation device 160 to be dropped down to the surface of the water via the rope 164 attached to the rope connector 162. The rope 164 can be detached with or without the rope connector 162—either gripper or reel—from the UAV 100.

Although not shown in this figure, the UAV 100 also includes one or more onboard batteries to power the electronics on board.

In some embodiments, the light strobe 170 is a light strobe signal source that is configured to visually warn people at beach in the open water of the beachfront area when there is an identified ocean hazard in the area.

In some embodiments, the speaker with microphone 172 is a warning speaker with microphone 172 that is configured to audibly warn people in the water or on the beach in the beachfront area when an ocean hazard is identified. In some embodiments, the microphone is configured for communication feedback from people being rescued or other people in the beachfront area. In this way, the UAV 100 is able to communicate with people in the beachfront area. In some embodiments, the light strobe emits a visual strobe signal to visually warn people in the water or on the beach in the beachfront area when an ocean hazard is identified. In this way, the UAV 100 is able to communicate with people who may be hard of hearing or who cannot hear at all.

The operation center 180 comprises the ground video/network/data/audio data radio 188, a ground operation computer 190 that an operator 196 controls, and a battery charger/replacement 198. The ground operation computer 190 is configured to receive data from the ground video/network/data/audio data radio 188. The ground operation computer 190 may display details or information about the autonomous operations of the UAV 100. The operator 196 is not needed for these autonomous operations since the UAV 100 is fully automated. However, the operator 196 may interact with the ground operation computer 190 to view the detailed information about the autonomous operations, the status of a mission (e.g., making a fly-over of the entire beachfront area), and other information or details about situations that are responded to by the UAV 100. The battery charger/replacement 198 provides a known location to which the UAV 100 may navigate to recharge onboard batteries or perform battery replacement (e.g., by the operator 196 or automatically).

Figure 2:
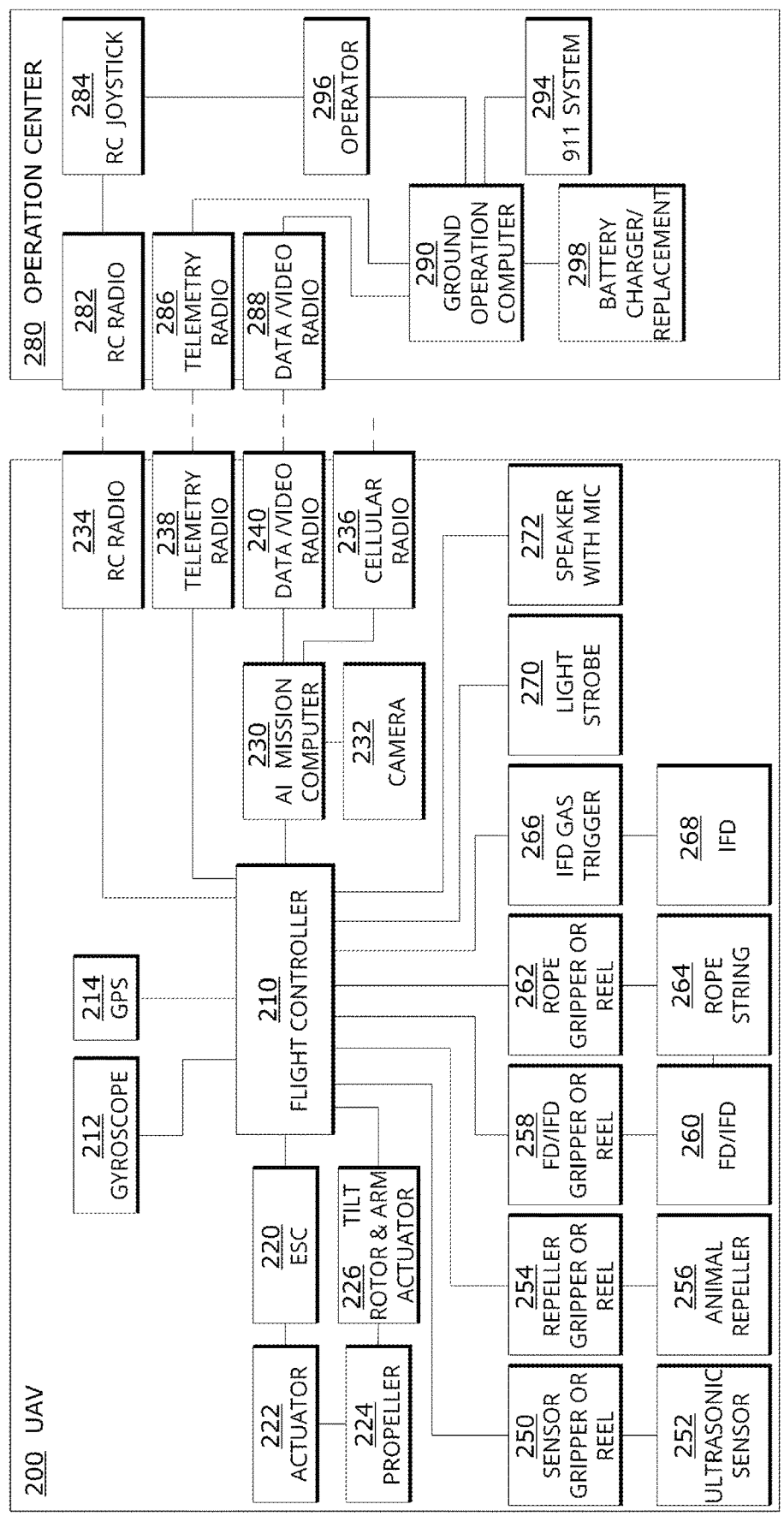
FIG. 2 conceptually illustrates an automated UAV open water beachfront hazard recognition, warning, and rescue system in some other embodiments.

Turning to another example, FIG. 2 conceptually illustrates another embodiment of the automated UAV open water beachfront hazard recognition, warning, and rescue system. As shown in this figure, the automated UAV open water beachfront hazard recognition, warning, and rescue system comprises a UAV 200 and an operation center 280.

The UAV 200 comprises a flight controller 210, a gyroscope 212, a GPS receiver 214, an electronic speed controller (ESC) 220, a thrust and flight actuator 222, a propeller 224, a tilt rotor & arm actuator 226 for wind resistance, an AI mission computer 230, a camera 232, a remote control (RC) radio 234, a cellular radio 236, a telemetry radio 238, a video/network/data/audio data radio 240, a sensor connector 250, an ultrasonic sensor 252, a repeller connector 254, an animal repeller device 256, a FD/IFD connector 258, an FD/IFD 260, a rope connector 262, a rope 264, an inflatable floatation device (IFD) gas trigger 266, an IFD 268, a light strobe 270 configured to visually warn people of ocean hazards identified nearby the beachfront area, and an audio speaker with pick-up microphone 272 configured to audibly warn people of identified open water hazards. In some embodiments, the pick-up microphone is configured for communication feedback from people being rescued or other people in the beachfront area.

In some embodiments, the sensor connector 250 comprises a gripper connector assembly. In some embodiments, the sensor connector 250 comprises a reel connector assembly.

In some embodiments, the repeller connector 254 comprises a gripper connector assembly. In some embodiments, the repeller connector 254 comprises a reel connector assembly.

In some embodiments, the FD/IFD connector 258 comprises a gripper connector assembly. In some embodiments, the FD/IFD connector 258 comprises a reel connector assembly.

In some embodiments, the rope connector 262 comprises a gripper connector assembly. In some embodiments, the rope connector 262 comprises a reel connector assembly.

An example of a gripper connector assembly is described below, by reference to FIG. 10, while an example of a reel connector assembly is described further below, by reference to FIG. 11.

In some embodiments, the flight controller 210 comprises an embedded computer with CPU, memory, storage, gyroscopes, I/O to actuators, GPS, sensors, gripper, servo motors. In some embodiments, the flight controller 210 supports serial input/output (I/O) for communication with actuators, one or more gyroscope(s) 212, one or more GPS receiver(s) 214, sensors, connectors (grippers, reels), the electronic speed controller (ESC) 220, servo motors, the IFD gas trigger 266, the light strobe 270, and the speaker with microphone 272. In some embodiments, the flight controller 210 maintains feedback controls, such as Proportional, Integral, and Derivative (PID) control, of flight actuators (such as the thrust and flight actuator 222) to maintain flight and maneuver the UAV 200. In some embodiments, the flight controller 210 controls motor speed of the UAV 200 through serial I/O communication with the electronic speed controller (ESC) 220.

In some embodiments, the AI mission computer 230 manages the flight controller 210 during operation of the UAV 200. In some embodiments, the AI mission computer 230 manages I/O of the flight controller 210 directly or indirectly. In some embodiments, the AI mission computer 230 analyzes information and relays the analyzed information to the ground operation computer 290 of the operation center 280 through a video data network formed by connection of the video/network/data/audio data radio 240 with the ground video/network/data/audio data radio 288 of the operation center 280.

In some embodiments, the UAV 200 comprises a plurality of parallel connected gyroscopes 212. In some embodiments, the plurality of parallel connected gyroscopes 212 comprises the gyroscope 212 and one or more additional gyroscope devices. In some embodiments, the plurality of parallel connected gyroscopes 212 connect individually and in parallel to the flight controller 210.

In some embodiments, the UAV 200 comprises a plurality of parallel connected GPS receivers 214. In some embodiments, the plurality of parallel connected GPS receivers 214 comprises the GPS receiver 214 and one or more additional GPS receiver, module, device, etc. In some embodiments, the plurality of parallel connected GPS receiver 214 connect individually and in parallel to the flight controller 210. In some embodiments, the plurality of parallel connected GPS receivers 214 provide optimized position accuracy for the UAV 200.

In some embodiments, the UAV 200 comprises a plurality of parallel connected electronic speed controllers (ESCs) 220. In some embodiments, the plurality of parallel connected electronic speed controllers (ESCs) 220 comprises the ESC 220 and one or more additional electronic speed controllers (ESCs) 220. In some embodiments, the plurality of parallel connected electronic speed controllers (ESCs) 220 connect individually and in parallel to the flight controller 210 and the plurality of parallel connected thrust and flight actuators 222.

In some embodiments, the UAV 200 comprises a plurality of parallel connected thrust and flight actuators 222. In some embodiments, the plurality of parallel connected thrust and flight actuators 222 comprises the thrust and flight actuator 222 and one or more additional thrust and flight actuators 222. In some embodiments, the plurality of parallel connected thrust and flight actuators 222 connect individually and in parallel to the plurality of parallel connected electronic speed controllers (ESCs) 220.

In some embodiments, the UAV 200 comprises a plurality of parallel connected propellers 224. In some embodiments, the plurality of parallel connected propellers 224 comprises the propeller 224 and one or more additional propellers 224. In some embodiments, the plurality of parallel connected propellers 224 connect individually and in parallel to the plurality of parallel connected thrust and flight actuators 222.

In some embodiments, the UAV 200 comprises a plurality of parallel connected tilt rotor & arm actuators 226. In some embodiments, the plurality of parallel connected tilt rotor & arm actuators 226 comprises the tilt rotor & arm actuator 226 and one or more additional tilt rotor & arm actuators 226. In some embodiments, the plurality of parallel connected tilt rotor & arm actuators 226 connect individually and in parallel to the flight controller 210 and the plurality of parallel connected propellers 224.

In some embodiments, the camera 232 comprises a fixed camera attached to the UAV 200. In some embodiments, the camera 232 comprises a camera gimbal with zoom. In some embodiments, the UAV 200 comprises a plurality of parallel connected cameras 232. In some embodiments, the plurality of parallel connected cameras 232 comprises the camera 232 and one or more additional cameras, image capture devices, or video capture devices. In some embodiments, the plurality of parallel connected cameras 232 connect individually and in parallel to the AI mission computer 230, while the AI mission computer 230 connects directly to the flight controller 210.

In some embodiments, the cellular radio 236 is configured to connect to a cellular tower in a cellular wireless communication channel. For example, the UAV 200 may be configured to automatically call emergency services (e.g., by dialing '9-1-1') when an identified ocean hazard is associated with a particular emergency, such as a person who has nearly drowned from a riptide pulling them under water, or a person who was bitten by a shark, etc.

The operation center 280 comprises an RC radio 282, a RC joystick 284, a ground telemetry radio 286, a ground video/network/data/audio data radio 288, a ground operation computer 290 that an operator 296 controls, a direct dial emergency system 294, and a battery charger/replacement 298. In this configuration, the operation center 280 includes the direct dial emergency system for human operation as well as automated operation. While the operator 296 may be able to use the direct dial emergency system 294 to contact emergency responders, the automated UAV open water beachfront hazard recognition, warning, and rescue system is fully automated and capable of automatically triggering the direct dial emergency system 294 when the ground operation computer 290 determines that first/emergency responders are needed at the beachfront. Also, when the ground telemetry radio 286 connects with the telemetry radio 238, a flight telemetry data link is established (such as MAVLink) between the flight controller 210 and the AI mission controller 230 components of the UAV 200 and the ground operation computer 290 located in the operation center 280. Thus, the UAV captures flight telemetry data and sends to the ground operation computer 290. The telemetry data can be embedded into the IP data network. Furthermore, the ground operation computer 290 processes and analyzes all the data received from the UAV 200 (including telemetry data received by the ground telemetry radio 286 and the video/network/data/audio data received by the ground video/network/data/audio data radio 288) and, when warranted, triggers the direct dial emergency system 294 to contact the emergency responders (e.g., triggering automatic dialing of '9-1-1').

In some embodiments, the battery charger/replacement 298 provides a known location to which the UAV 200 may navigate to recharge onboard batteries or perform battery replacement (e.g., by the operator 296 or automatically).

In some embodiments, the video/network/data/audio data radio 240 and the ground video/network/data/audio data radio 288 of the operation center 280 are wireless, radio frequency (RF)-based communication radios that share a particular RF communication channel to communicate.

In some embodiments, the telemetry radio 238 and the ground telemetry radio 286 of the operation center 280 are wireless, radio frequency (RF)-based communication radios that share a particular RF communication channel to communicate and share telemetry data.

In some embodiments, the RC radio 234 and the ground RC radio 282 of the operation center 280 are wireless, radio frequency (RF)-based communication radios that share a particular RF communication channel so that an operator 296 located in the operation center 280 can remotely control navigation of the UAV 200 during flight. Furthermore, the operation center 280 in this configuration include the RC joystick 284 which is configured to allow the operator 296 to override the automated flight path of the UAV 200 and manage height, direction, speed, etc., of the UAV 200. This connection can be embedded into the telemetry or IP data network with different implementations between video/network/data/audio data radio 240 and ground video/network/data/audio data radio 288. The communication from the RC joystick 284 to the flight controller 210 occurs, from the outgoing side, over the RC radio 282 and, from the incoming side, through the RC radio 234 and then directly to the flight controller 210.

In some embodiments, the sensor connector 250 of the UAV 200 connects the ultrasonic sensor 252 to a sensor actuator. In some embodiments, the sensor actuator of the UAV 200 comprises an ultrasound actuator. In some embodiments, the sensor connector 250 is similar to sensor connector 150 of UAV 100 comprising either a sensor gripper or a sensor reel.

In some embodiments, the repeller connector 254 of the UAV 200 connects the animal repeller device 256 to a repeller device actuator. In some embodiments, the repeller device actuator comprises a magnetic field actuator. In some embodiments, the repeller connector 254 is similar to the repeller connector 154 comprising either an animal repeller gripper or an animal repeller reel.

In some embodiments, the animal repeller device 256 of the UAV 200 comprises an ultrasound actuator to deter sharks. In some embodiments, the animal repeller device 256 comprises a strong magnet and a magnetic field sensor. In some embodiments, the animal repeller device 256 is similar to the animal repeller device 156 of UAV 100 comprising a magnetic field actuator to deter sharks that are sensitive to or capable of sensing increased/changed magnetic field which may induce a stress response in the shark to move away from the magnetic field. Beyond sharks, the magnetic field actuator and/or the ultrasound actuator may emit sensations that are specific to marine animal species and their preferences or dislikes.

In some embodiments, the IFD gas trigger 266 is configured to inflate the IFD 268 with a gaseous fluid (such as oxygen) prior to dropping the IFD 268 down to the water for a rescue.

In some embodiments, the FD/IFD connector 258 is similar to the FD/IFD connector 158 of UAV 100, comprising either a gripper or a reel. The FD/IFD connector 258 of the UAV 200 is configured to hold the FD/IFD 260 for life saving rescues at sea. Similar to the FD/IFD 160, the FD/IFD 260 of UAV 200 can be detached from the FD/IFD connector 258 when needed to rescue a human in the water of the beachfront area (e.g., detached and dropped down to the surface of the water). However, unlike the FD/IFD 160 of UAV 100, the FD/IFD 260 of UAV 200 may be detached after inflation of the FD/IFD 260 by IFD gas trigger 266. Whether fully inflated or not, the FD/IFD 260 of the UAV 200 is attached to the rope 264. The rope 264 is attached to the rope connector 262 and allows the FD/IFD 260 to be dropped down from UAV 200 to the surface of the water. The rope 264 can be detached with or without the rope connector 262—either gripper or reel—from the UAV 200.

Although not shown in this figure, the UAV 200 also includes one or more onboard batteries to power the electronics on board.

Figure 3:
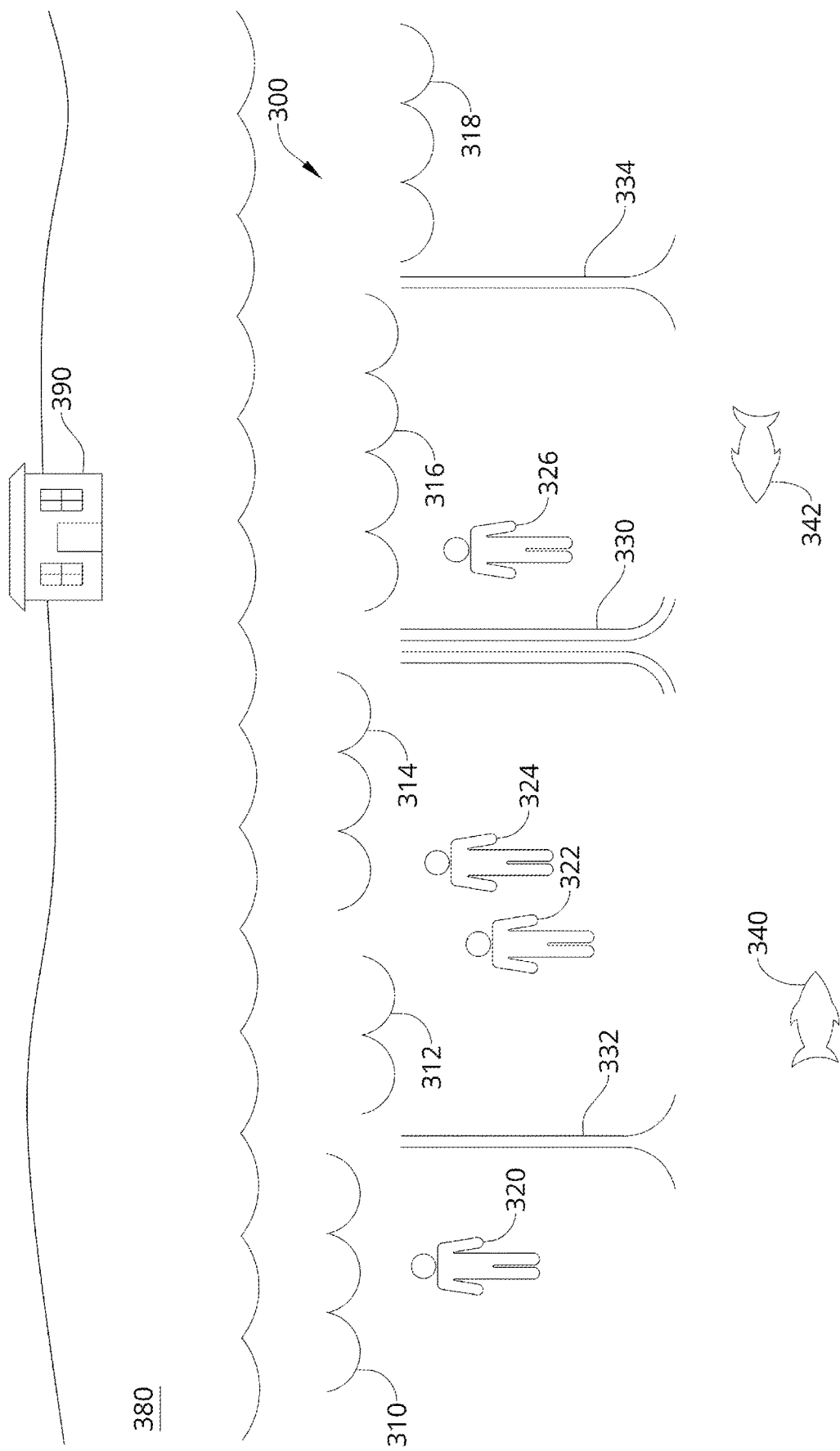
FIG. 3 conceptually illustrates an exemplary beachfront area at which the automated UAV open water beachfront hazard recognition, warning, and rescue system may be deployed for use.

By way of example, FIG. 3 conceptually illustrates an exemplary UAV scout range over a beachfront area 300 at which the automated UAV open water beachfront hazard recognition, warning, and rescue system may be deployed for use. As shown in this figure, the UAV scout range over the beachfront area 300 is located from a shoreline of a beach 380 out to a seaward boundary that is under the purview of a lifeguard who may be an operator in a lifeguard operation center (LOC) 390 located on the beach 380. The open water portion of the UAV scout range over the beachfront area 300 includes several possible ocean hazards, such as waves 310-318, rip currents 330-334, and sea animals 340-342. Several people 320-326 are shown in the open water. When the UAV is operating according to the automated flight plan, the UAV flies over and scans the UAV scout range over the beachfront area 300. The UAV automatically detects the possible ocean hazards including the waves 310-318, the rip currents 330-334, and the sea animals 340-342, as well as the people 320-326. The UAV uses proximity evaluation with respect to each person to identify ocean hazards at each location of a person. Thus, for a first person 320, the UAV may identify wave 310 and rip current 332 as being proximate to the first person 320. The UAV evaluates the potential risk of the wave 310 and the rip current 332 with respect to the first person 320. For example, if the first person 320 is identified by the UAV to be a child, the wave 310 and rip current 332 may be evaluated to be a strong potential risk. On the other hand, if the first person 320 is identified by the UAV to be a large adult, the wave 310 and/or rip current 332 may not be considered a great risk.

The UAV performs the same evaluation for each person identified in the open water. Accordingly, for a second person 322, the UAV may identify wave 312, rip current 332, and sea animal 340 as being proximate to the second person 320 and then evaluates the potential risk. For example, if the second person 322 is determined to be a large adult, and the wave 312 is determined to be consistently small and the rip current 332 is determined to be insignificant, then the UAV will not warn the second person 322 of those risks. However, if the sea animal 340 is identified as a great white shark, then the UAV may immediately warn the second person 322 of the potential risk from the shark. Indeed, the magnitude of risk to all people in the water 320-326 may be so great when the sea animal 340 is identified as a great white shark that the UAV warns all people 320-326 to exit the open water and head for the beach 380. The warnings from the UAV may be in audible and visual (strobe light) form. On the other hand, if sea animal 340 is determined to be a harmless fish, then the UAV may not find an imperative need to warn the second person 322 of any potential ocean hazard.

Scanning the entire UAV scout range over the beachfront area 300, the UAV evaluates the other ocean hazards, namely, the rip current 330 which appears stronger than rip current 332 and rip current 334. A third person 324 and a fourth person 326 appear to be nearby the rip current 330, so the UAV would initiate a warning (either audible or visual or both) to warn of the risk. The UAV would evaluate the risk of hazard from the wave 314 for the third person 324 and the wave 316 for the fourth person 326, and proceed accordingly with respect to the possible danger to them. The UAV would evaluate sea animal 342 in the manner noted above for sea animal 340. Thus, the potential for hazard from sea animal 342 depends on the type of sea animal and its proximity to the people in the water 320-326. If sea animal 342 were determined to be a giant sea tortoise, then sea animal 342 may present a risk of danger to the people 320-326. However, a giant sea tortoise moves through the water at a much slower pace than a great white shark, so the UAV may determine that a warning is sufficient if only provided to the fourth person 326, due to the proximity of the fourth person 326 to the sea animal 342. Going through the remaining sea hazards, the UAV may determine that wave 316 is consistently large and breaks in a way that crashes down. Thus, the UAV may warn the fourth person 326 of this potential danger (along with the danger of rip current 330 and the possible danger of sea animal 342). On the other hand, the UAV may determine wave 318 to large and dangerous in the same way as wave 316, but not warn anyone about it because none of the people in the water 320-326 are close enough to wave 318 to be at risk. Same for rip current 334.

The automated UAV open water beachfront hazard recognition, warning, and rescue system of the present disclosure generally works by automatically maneuvering the UAV over to a UAV operating region. Actuators will arm, and the UAV will take off. The UAV will reach its initial scouting position, which would be a certain distance into the ocean where rip currents or sea animals commonly appear. Then, it will begin its scouting operation, going in a motion around the ocean. The UAV will stay near enough to LOC so if it needs to charge, the UAV has sufficient battery to safely fly back to the charger. During this motion, the UAV will check if rip current rescue mode when someone stuck in rip current, sea animal rescue mode when someone getting attacked by sea animal, rip current warning mode when rip current with someone nearby, or sea animal warning mode when sea animal with someone nearby, are necessary. If none of them are necessary, the UAV will check if it has enough battery to continue, and if it does, it will continue patrolling. However, if the UAV lacks sufficient battery, it will notify LOC and return to LOC charging station. If none of the modes were activated, the UAV would continue the scouting operation. It will maneuver over scouting range 300 and automated flight path and collect images from camera(s). It will analyze a series of sequential images and identify beach waves 310-318, people 320-326, and sea animals 340-342. After numbering the identified objects, the UAV will register the identified objects over the series of images. The UAV will identify the positions of possible rip currents 330-334 by analyzing registered waves and sections between those waves. Then, it will check if there is a rip current position by analyzing back flow channel 330-334 in the series of images. It will upload registered object data and representative images to LOC 390. If there are potential dangers, the UAV will notify the ground operation computer at the LOC 390 and stop scouting mode to go into a mode that is suitable for the danger that is detected. However, if there is no danger, the UAV will check if the UAV has completed the automated flight path over the scouting range. If it is, the UAV will report a summary of the scouting analysis results to the LOC 390. However, if the UAV is not completed with the automated flight path over the scouting range, the UAV will go repeat the scouting operation.

If the UAV begins rip current rescue mode, it will fly to the situation with a certain amount of horizontal distance away from the person in danger. The UAV will obviously remain above the victim, but the horizontal distance remains so that the inflatable floating device dropped by the UAV does not hit the victim. After the inflatable rescue device is dropped, the UAV will drag the inflatable floatation device connected to it by rope to the victim, and then pull it away from the rip current, preferably orthogonal to rip current flow. However, if the person has not caught the FD or IFD, the UAV will continue dragging the inflatable rescue device towards the victim. If the battery of the UAV is not low, the UAV will pull the person and inflatable floatation device to the beach once it gets out of the rip current. Then, it will drop the rope at the beach once the person has arrived at the beach. During the pulling, the UAV will continuously check if the person is still holding onto the floatation device and its battery. If battery is low or the person is not holding on, the UAV will proceed with the actions it would have taken before if those problems previously occurred.

During the rescue operation, the UAV will check if it has low battery and if there are people at the beach to help. If so, the UAV will fly as fast as possible to the ocean shore to get the end of the rope as close to the sand as possible, so that people or lifeguard at beach can pull the victim toward beach. If the UAV has low battery but there are no people at the beach trying to help, the UAV will find a safe place to crash into the ocean and activate its inflatable floatation mode by turning on its gas actuator, so that the victim can use the UAV itself as a floatation device until a lifeguard arrives.

To make the automated UAV open water beachfront hazard recognition, warning, and rescue system of the present disclosure, a person may acquire a UAV and assemble the parts in connection with the UAV (e.g., motors, FDs or IFDs, battery, etc.). Additionally, it will be imperative that the UAV is capable of scouting, rescue operation, hermetic sealing against sea weather elements, and strong wind resistance. The UAV will be configured to have stand-alone AI detection and a self-learning capability (machine learning) to identify rip currents and sea animals. So, the person would need to develop and implement software that is capable of performing the AI detection and machine learning to update the model used to identify rip currents and sea animals. The UAV should have redundant thrust and control mechanism to overcome operational challenges and malfunctions. The UAV would have sufficient power and back-up power for emergency operation. The UAV and LOC should have redundant communication channels to maintain data communications over emergencies. Also, the software is properly downloaded onto the final product and that a connection between the ground control radios and air radios and established. A charger with a stable position on the lifeguard tower would be essential.

In some embodiments, the tilt-rotor and arm extension are optional components of the automated UAV open water beachfront hazard recognition, warning, and rescue system. Nevertheless, the tilt-rotor and arm extension components improve flight performance and rescue operations under strong weather conditions and, therefore, are included in some embodiments of the automated UAV open water beachfront hazard recognition, warning, and rescue system.

In some embodiments, the automated UAV open water beachfront hazard recognition, warning, and rescue system may include additional elements/components which, when added to the UAV, make the UAV more productive. For instance, the UAV could function within caves and assist in search-and-rescue missions by providing analysis of the area. Additionally, the automated UAV open water beachfront hazard recognition, warning, and rescue system may be equipped with a first aid kit, water or food, which could be stored within the UAV along with the FD or IFD and rope in case someone is stuck in an area that cannot be reached by emergency personnel quickly enough.

In some embodiments, the automated UAV open water beachfront hazard recognition, warning, and rescue system is configured to differentiate between blood and red clothes or other red objects (e.g., red sea kelp), which would help it provide a more accurate update to lifeguards regarding emergency or normal situations.

In some embodiments, the automated UAV open water beachfront hazard recognition, warning, and rescue system is configured to identify lifeguards and differentiate lifeguards from other people. In this way, the automated UAV open water beachfront hazard recognition, warning, and rescue system is able to direct the UAV to identify lifeguards to provide them with accurate updates and other related help. Furthermore, by being capable of identifying lifeguards, the automated UAV open water beachfront hazard recognition, warning, and rescue system is able to direct the UAV to get out of the lifeguards' way or allow lifeguards to use the UAV's FD or IFD.

In some embodiments, the automated UAV open water beachfront hazard recognition, warning, and rescue system is configured to perform face recognition. For instance, the UAV may perform face recognition of beach goers to monitor for missing persons. To do so, the automated UAV open water beachfront hazard recognition, warning, and rescue system may analyze faces using facial recognition to aid the search efforts. The automated UAV open water beachfront hazard recognition, warning, and rescue system may also use previously-recorded, registered information of a person on the beach and the person's movement over time to track the location of the person.

In some embodiments, the automated UAV open water beachfront hazard recognition, warning, and rescue system may perform operations under water. Specifically, if the UAV cannot deter a sea animal from attacking a human, it could implement an underwater function using its rotors and drive underwater to be closer to the sea animal and make louder high-frequency sounds or physically contact the sea animal to protect the person in danger. In this case, the UAV would be equipped with waterproof materials capable of underwater operation to certain depths. In some embodiments, instead of a UAV, the automated UAV open water beachfront hazard recognition, warning, and rescue system may provide a detached submersible underwater vehicle.

In some embodiments, the AI mission computer can be deployed at the lifeguard operation center, as the ground operation computer. Then the UAV has only the flight controller onboard, relying on wireless communication to and from the LOC for complete analysis and processing of ocean hazards over a scout range or beachfront area under the guard of a lifeguard or lifeguard team. This would provide a benefit in that it would centralize the video and image processing. This is desirable as a back-up when local on-board AI mission computer fails, or overloaded with too much information more than it can process in time.

In some embodiments, the UAV of the automated UAV open water beachfront hazard recognition, warning, and rescue system is equipped with tilt rotors and arm extensions. In some embodiments, the tilt rotors and arm extensions operate to overcome strong wind conditions at the beachfront.

In some embodiments, the sea animal repelling actuator can be magnetic to repel sharks or ultrasonic for other species. In some embodiments, the sea animal repelling actuator can be replaced by the seasonal animal's preference or dislike.

Usage of the automated UAV open water beachfront hazard recognition, warning, and rescue system of the present disclosure intends to be autonomous. Therefore, human operation and involvement is minimal after deployment of the automated UAV open water beachfront hazard recognition, warning, and rescue system and, especially, after the UAV take flights. When airborne, the UAV will move faster and analyze images with more detail and accuracy with its deployment of machine learning. The machine learning provides a type of expert analysis of the imaging. Also, during usage of the automated UAV open water beachfront hazard recognition, warning, and rescue system, the UAVs will be able to cover a large amount of area including the beachfront area over the beach and ocean area where people are present, and running up and down the coastline (which can extend miles). In some embodiments, the automated UAV open water beachfront hazard recognition, warning, and rescue system deploys multiple UAVs. When there are multiple UAVs flying at once, the automated UAV open water beachfront hazard recognition, warning, and rescue system ensures collision-free flight paths of the UAVs by a coordinated grid layout and communication backbone for collective analysis of UAV results. In some embodiments, the automated UAV open water beachfront hazard recognition, warning, and rescue system is configured with settings customized for seasons and conditions specific to the time of year or location. In this way, the UAVs can also be adjusted to what season it is and according to the physical terrain features in and around the beachfront area, the location of the beachfront (e.g., an area known for more rip currents), and the time of year/season (e.g., certain sea animals migrating through the beachfront during particular seasons, etc.). Furthermore, the AI engine of the automated UAV open water beachfront hazard recognition, warning, and rescue system is configured to allow each UAV to adjust scouting areas according to seasonal ocean changes, and tidal waves. Since the UAVs are automated, the automated UAV open water beachfront hazard recognition, warning, and rescue system can be configured to run UAV monitoring patrols that are launched remotely during early morning and late evening when lifeguards are not supervising the ocean.

Lifeguards may use the automated UAV open water beachfront hazard recognition, warning, and rescue system to acquire information and assess emergency situations quickly. In this way, it is possible to quickly deploy lifeguards to the scene, as needed. However, even when lifeguards are not deployed to the scene, the UAV itself may carry out the rescue mission by its own automated operation.

The automated UAV open water beachfront hazard recognition, warning, and rescue system of the present disclosure can be adapted for other uses. For instance, the automated UAV open water beachfront hazard recognition, warning, and rescue system could be adapted to observe tsunami waves when an earthquake hits, warn and guide people at the beach when a tsunami hits, and assist the Coast Guard's maritime operation. The automated UAV open water beachfront hazard recognition, warning, and rescue system could be deployed in an adapted manner to act as a temporary weather station in the ocean and extend a temporary rescue data network extension into the ocean.

Figure 4:
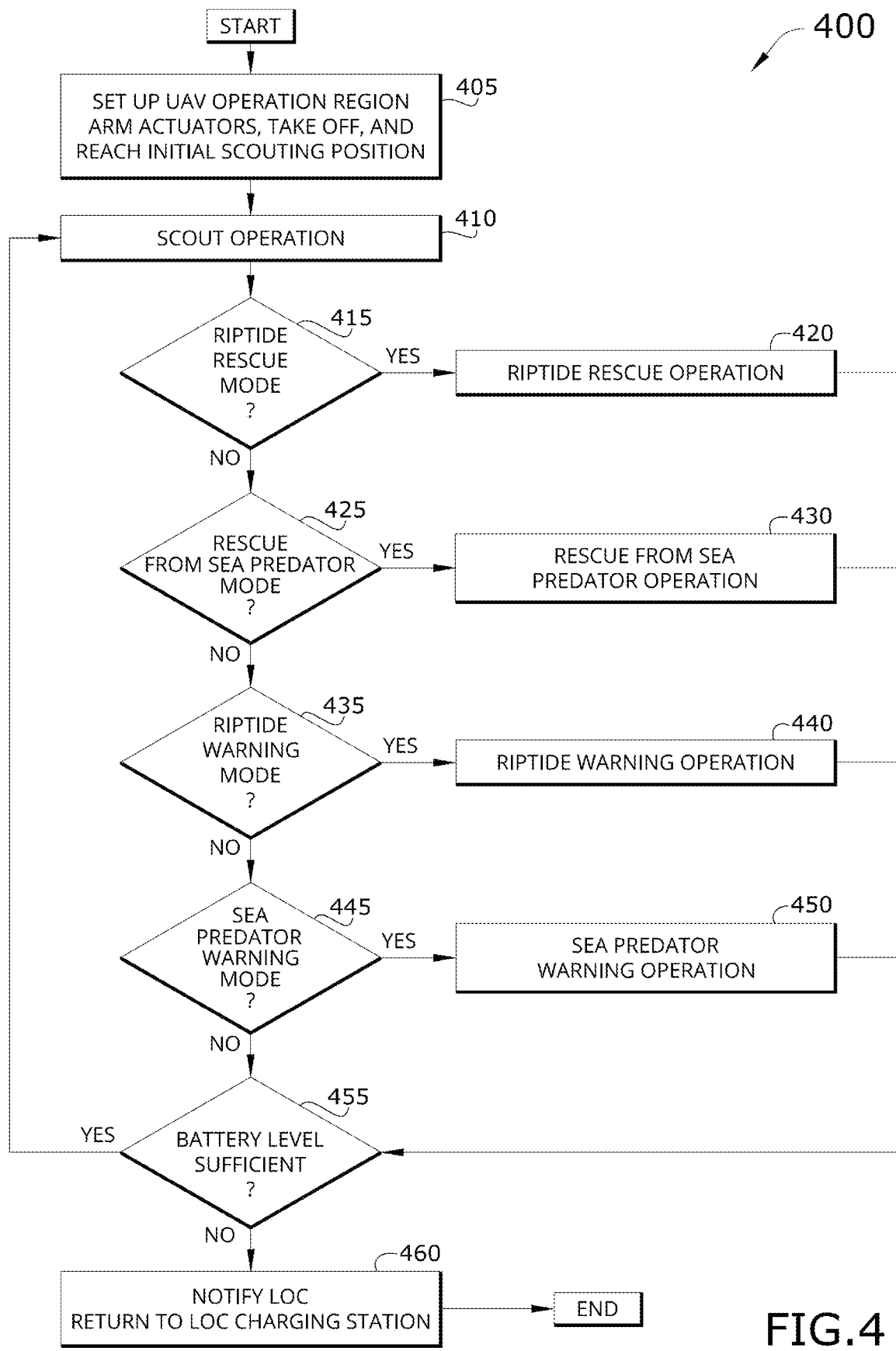
FIG. 4 conceptually illustrates an automated UAV open water beachfront hazard recognition, warning, and rescue process in some embodiments.

By way of example, FIG. 4 conceptually illustrates an automated UAV open water beachfront hazard recognition, warning, and rescue process 400. The automated UAV open water beachfront hazard recognition, warning, and rescue process 400 is performed by an automated UAV open water beachfront hazard recognition, warning, and rescue program running on an AI mission computer in connection with a flight controller of a UAV engaged in an automated scout mission of a beachfront area. As shown in this figure, the automated UAV open water beachfront hazard recognition, warning, and rescue process 400 starts with setting up UAV operation region and arming actuators, which is followed by flight take off until the UAV reaches an initial scouting position (at 405).

In some embodiments, the automated UAV open water beachfront hazard recognition, warning, and rescue process 400 provides an overall flow of operations performed by the UAV during the automated scout mission of the beachfront area. Accordingly, after the UAV reaches the initial scouting position, the UAV will scan the scout range over the beachfront area. The automated UAV open water beachfront hazard recognition, warning, and rescue process 400 demonstrates this at a scout operation step (at 410). The scout operation is dictated by the automated flight path over the scout range, which is programmed into the UAV. While performing the scout operation (at 410), the automated UAV open water beachfront hazard recognition, warning, and rescue process 400 makes several rescue and warning determinations and monitors battery level. The determinations that are described below are not necessarily performed in the order shown and described here, but may be performed in a different order or in parallel with each other. An example of a detailed scout operation is described below, by reference to FIG. 5.

Specifically, the automated UAV open water beachfront hazard recognition, warning, and rescue process 400 determines (at 415) whether riptide rescue mode is triggered. Riptide rescue mode is triggered when, for example, the AI mission computer identifies a riptide in the open water, determines that the riptide is too strong for humans to safely approach, and also identifies a person at a position in the water nearby the riptide. An example of a detailed rip current rescue operation process is described below, by reference to FIG. 6. When riptide rescue mode is triggered ('YES'), the automated UAV open water beachfront hazard recognition, warning, and rescue process 400 moves on to a step for performing a riptide rescue operation (at 420). After the riptide rescue operation (at 420), the automated UAV open water beachfront hazard recognition, warning, and rescue process 400 proceeds to a step for determining (at 455) whether the UAV battery level retains sufficient charge to continue automated flight operations by the UAV, which is described further below.

Turning back to the determination (at 415), when riptide rescue mode is not triggered ('NO'), the automated UAV open water beachfront hazard recognition, warning, and rescue process 400 transitions to a step for determining (at 425) whether rescue from sea predator mode is triggered. Rescue from sea predator mode is triggered when, for example, the AI mission computer identifies a dangerous sea animal attacking, biting, touching, or otherwise threatening the physical safety of a person in the open water. An example of a detailed sea predator rescue operation process is described below, by reference to FIG. 7. When rescue from sea predator mode is affirmatively triggered ('YES'), the automated UAV open water beachfront hazard recognition, warning, and rescue process 400 moves forward to step for carrying out a rescue from sea predator operation (at 430). After the rescue from sea predator operation (at 430), the automated UAV open water beachfront hazard recognition, warning, and rescue process 400 determines (at 455) whether the UAV battery level retains sufficient charge to continue automated flight operations by the UAV.

However, when rescue from sea predator mode is not determined (at 425) to be triggered, then the automated UAV open water beachfront hazard recognition, warning, and rescue process 400 moves forward with a determination (at 435) of whether riptide warning mode is triggered. Riptide warning mode is triggered when, for example, the AI mission computer identifies a riptide in the open water, determines a relative strength of the riptide (from weak riptide to strong riptide), and also identifies one or more persons in the open water nearby the riptide. An example of a detailed rip current warning process is described below, by reference to FIG. 8. When riptide warning mode is triggered ('YES'), the automated UAV open water beachfront hazard recognition, warning, and rescue process 400 moves ahead to a step for performing a riptide warning operation (at 440). For example, an audible warning to the people in the water. After the riptide warning operation (at 440), the automated UAV open water beachfront hazard recognition, warning, and rescue process 400 checks whether the battery level is sufficient or not (at 455) and proceeds accordingly.

On the other hand, when riptide warning mode is not determined (at 435) to be triggered, then the automated UAV open water beachfront hazard recognition, warning, and rescue process 400 transitions to another determination (at 445) of whether a sea predator warning mode is triggered or not. The sea predator warning mode is triggered when, for example, the AI mission computer identifies a sea animal somewhere in the scout range over the beachfront area open water and determines that the sea animal is a predator or a danger to humans. An example of a detailed sea predator warning process is described below, by reference to FIG. 9. When sea predator warning mode is triggered ('YES'), the automated UAV open water beachfront hazard recognition, warning, and rescue process 400 moves on to a step for carrying out a sea predator warning operation (at 450). For example, an audible warning to the people in the water to exit the water and warning the people on the beach not to enter the water, due to the identified sea predator. After the sea predator warning operation (at 450), the automated UAV open water beachfront hazard recognition, warning, and rescue process 400 checks the battery level (at 455).

When sea predator warning mode is not determined (at 445) to be triggered ('NO'), the automated UAV open water beachfront hazard recognition, warning, and rescue process 400 performs the step for checking the battery level and determining (at 455) whether the battery retains sufficient charge level or not. When the battery level is sufficiently charged, the automated UAV open water beachfront hazard recognition, warning, and rescue process 400 transitions back to the step for performing the scout operation (at 410) and continuing in the same manner thereafter as described above. On the other hand, when the battery level is determined (at 455) to be insufficient, then the automated UAV open water beachfront hazard recognition, warning, and rescue process 400 notifies the lifeguard operation center of the low battery power and returns to the operation center charging station (at 460). Then the automated UAV open water beachfront hazard recognition, warning, and rescue process 400 ends.

Figure 5:
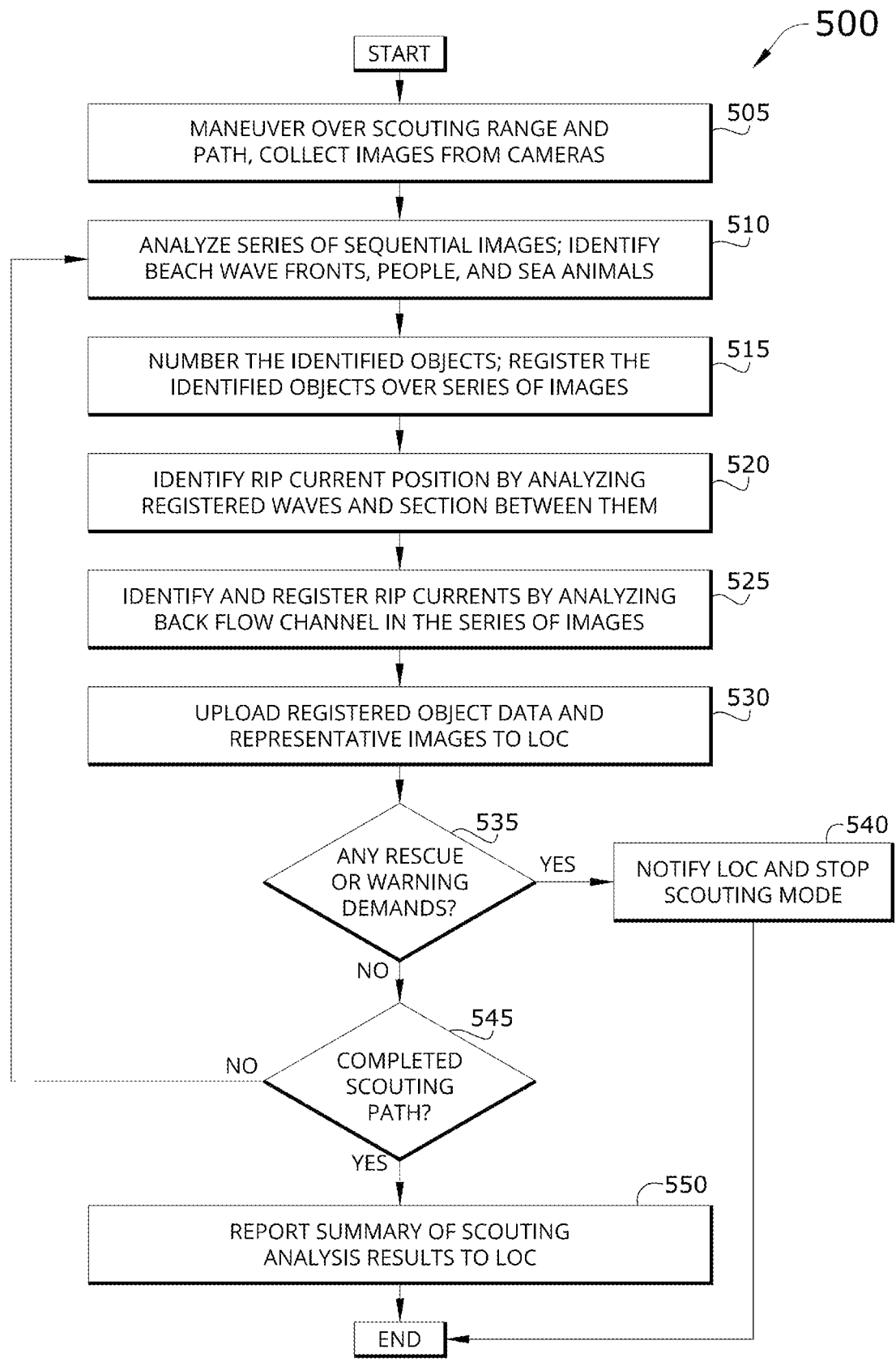
FIG. 5 conceptually illustrates a detailed scouting operation process in some embodiments.

By way of example, FIG. 5 conceptually illustrates a detailed scouting operation process 500. The detailed scouting operation process 500 is performed by the automated UAV open water beachfront hazard recognition, warning, and rescue program running on the AI mission computer in connection with the flight controller of the UAV engaged in an automated scout mission over a scout range of a beachfront area. As shown in this figure, the detailed scouting operation process 500 starts with maneuvering the UAV over the scout range according to the automated flight path (at 505) and capturing/collecting images and/or videos from one or more cameras connected to the UAV.

In some embodiments, the detailed scouting operation process 500 performs a step for analyzing (at 510) a series of sequential images (as captured/collected) and identifying objects within the captured/collected images, such as beach wave fronts, people, and sea animals. Next, the detailed scouting operation process 500 performs a step for numbering the identified objects and registering the identified objects over series of images (at 515).

In some embodiments, the detailed scouting operation process 500 performs a step for identifying (at 520) rip current position by analyzing the registered waves and sections between the registered waves. Then the detailed scouting operation process 500 moves on to a step for identifying and registering rip currents by analyzing back flow channel in the series of images (at 525). After identifying the rip current positions (at 520) and registering the rip currents (at 525), the detailed scouting operation process 500 performs a step for uploading the registered object data and representative images or the ground operation computer housed in the lifeguard operation center (at 530).

In some embodiments, the detailed scouting operation process 500 then moves on to a step for determining (at 535) whether any rescue or warning demands have been made during the scout mission. When rescue or warning demands have affirmatively been made during the scout mission ('YES'), the detailed scouting operation process 500 of some embodiments notifies the lifeguard operation center and stops the scouting operation/mode (at 540). After stopping the scouting operation/mode (at 540), the detailed scouting operation process 500 ends.

However, when rescue or warning demands have not been made during the scout mission ('NO'), then the detailed scouting operation process 500 determines (at 545) whether the automated flight path covering the scout range has been completed by the UAV or not.

When the automated flight path covering the scout range has not been completed ('NO'), the detailed scouting operation process 500 transitions back to the step for analyzing (at 510) the series of sequential images (as captured/collected) and identifying objects within the captured/collected images, such as beach wave fronts, people, and sea animals.

On the other hand, when rescue or warning demands have affirmatively been made during current the scout mission ('YES'), then the detailed scouting operation process 500 proceeds to a step for preparing a report summary of the scouting analysis results and transmitting this to the lifeguard operation center (at 550). Then the detailed scouting operation process 500 ends.

Figure 6:
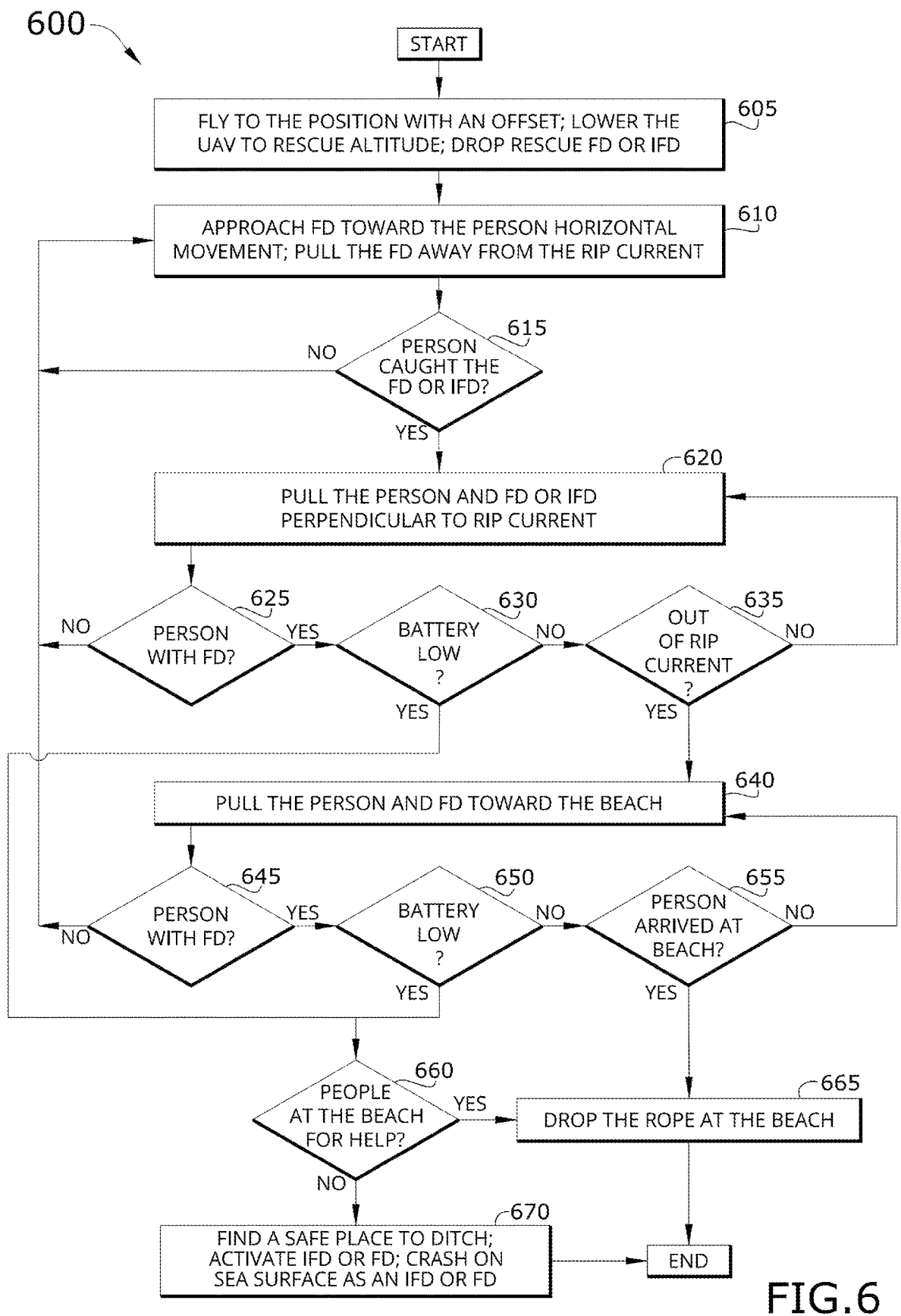
FIG. 6 conceptually illustrates a detailed rip current rescue operation process in some embodiments.

By way of example, FIG. 6 conceptually illustrates a detailed rip current rescue operation process 600. The detailed rip current rescue operation process 600 is performed by the automated UAV open water beachfront hazard recognition, warning, and rescue program running on an AI mission computer in connection with a flight controller of a UAV engaged in an automated scout mission of a beachfront area. As shown in this figure, the detailed rip current rescue operation process 600 starts by maneuvering the UAV into a position to rescue the person from the riptide (at 605) by flying to the position of the riptide with an offset, lowering the UAV to a suitable rescue altitude, and dropping a floatation device (FD) or inflatable floatation device (IFD) into the water nearby the person being rescued. Next, the detailed rip current rescue operation process 600 performs a step for getting the FD/IFD to approach the person being rescued, by horizontal movement toward the person, and then pulling the FD/IFD away from the rip current (at 610), if needed. For example, the UAV is able to pull the FD/IFD because there is an attachment rope connecting the UAV to the FD/IFD even after the FD/IFD is dropped into the open water, and in this way, can attempt to reposition the FD/IFD in the water to approach the person (in order for the person to catch the FD/IFD).

In some embodiments, the detailed rip current rescue operation process 600 proceeds to a step for determining (at 615) whether the person (being rescued) caught the FD/IFD or not. When the person did not catch the FD/IFD ('NO'), the UAV may retract the FD/IFD and try again. Thus, the detailed rip current rescue operation process 600 transitions back to the step for getting the FD/IFD to approach the person being rescued, by horizontal movement toward the person, and then pulling the FD/IFD away from the rip current (at 610).

However, when the person is affirmatively determined (at 615) to have caught the FD/IFD ('YES'), then the detailed rip current rescue operation process 600 proceeds forward to the next step, which involves pulling the person and the FD/IFD perpendicular to the rip current (at 620) in an attempt to rescue the person.

With the rescue underway, the detailed rip current rescue operation process 600 of some embodiments performs several determinations for moving forward. First, the detailed rip current rescue operation process 600 determines (at 625) whether person is with the FD/IFD or not. When the person is not with the FD/IFD ('NO'), the detailed rip current rescue operation process 600 transitions back to the step for getting the FD/IFD to approach the person being rescued, by horizontal movement toward the person, and then pulling the FD/IFD away from the rip current (at 610). On the other hand, when the person is affirmatively determined (at 625) to be with the FD/IFD ('YES'), then the detailed rip current rescue operation process 600 moves over to a second determination (at 630), which is a determination of whether the remaining charge of the battery of the UAV is low (at 630). When the battery is determined (at 630) to be low ('YES'), the detailed rip current rescue operation process 600 proceeds to a step for determining whether there are people at the beach for help (at 660), which is described in further detail below.

On the other hand, when the battery is not determined (at 630) to be low ('NO'), the detailed rip current rescue operation process 600 proceeds to the third determination at which it determines (at 635) whether the person is out of the rip current now. When the person is not out of the rip current ('NO'), the detailed rip current rescue operation process 600 transitions back to the step for pulling the person and the FD/IFD perpendicular to the rip current (at 620) in an attempt to rescue the person, and continuing as noted above. However, when the person is determined (at 635) to be out of the rip current ('YES'), the detailed rip current rescue operation process 600 proceeds to the next step for pulling the person and the FD/IFD toward the beach (at 640). While pulling the person and the FD/IFD toward the beach (at 640), the detailed rip current rescue operation process 600 makes another series of determinations, as explained next.

Specifically, the detailed rip current rescue operation process 600 determines (at 645) whether the person with the FD/IFD is being pulled toward the beach (at 645). When the person is not being pulled toward the beach ('NO') due to losing hold of the FD/IFD, the detailed rip current rescue operation process 600 transitions back to the step for getting the FD/IFD to approach the person being rescued, by horizontal movement toward the person, and then pulling the FD/IFD away from the rip current (at 610).

However, when the person has affirmatively retained hold of the FD/IFD ('YES'), the detailed rip current rescue operation process 600 moves forward to a step for determining (at 650) whether the remaining charge of the battery of the UAV is low or not (at 650). When the battery is determined (at 650) to be low ('YES'), the detailed rip current rescue operation process 600 proceeds to the step for determining whether there are people at the beach to help the person being rescued (at 660). When there are people at the beach to help with the rescue ('YES'), the detailed rip current rescue operation process 600 performs a step for dropping the rope at the beach (at 665). As noted above, the rope can be detached from the UAV. Then the detailed rip current rescue operation process 600 ends. However, when there are no people at the beach who can help with the rescue ('NO'), the detailed rip current rescue operation process 600 simply finds a safe place to ditch the automated flight path, activates the IFD or FD, and then crashes on the surface of the water as an IFD or FD (at 670). Then the detailed rip current rescue operation process 600 ends.

Turning back to the determination (at 650), when the battery level is not low ('NO'), the detailed rip current rescue operation process 600 proceeds to yet another determination (at 655) of whether or not the person being rescued has safely arrived at the beach. When the person has not been determined (at 655) to have arrived at the beach ('NO'), the detailed rip current rescue operation process 600 transitions back to the step for pulling the person and the FD/IFD toward the beach (at 640), just continuing the process of pulling the person to the beach. On the other hand, when the person has been affirmatively determined (at 655) to have safely arrived at the beach ('YES'), the detailed rip current rescue operation process 600 performs the step for dropping the rope at the beach (at 665), which ends up leaving the rope, the FD/IFD, and the person on the beach after the successful rescue operation. Then the detailed rip current rescue operation process 600 ends.

Figure 7:
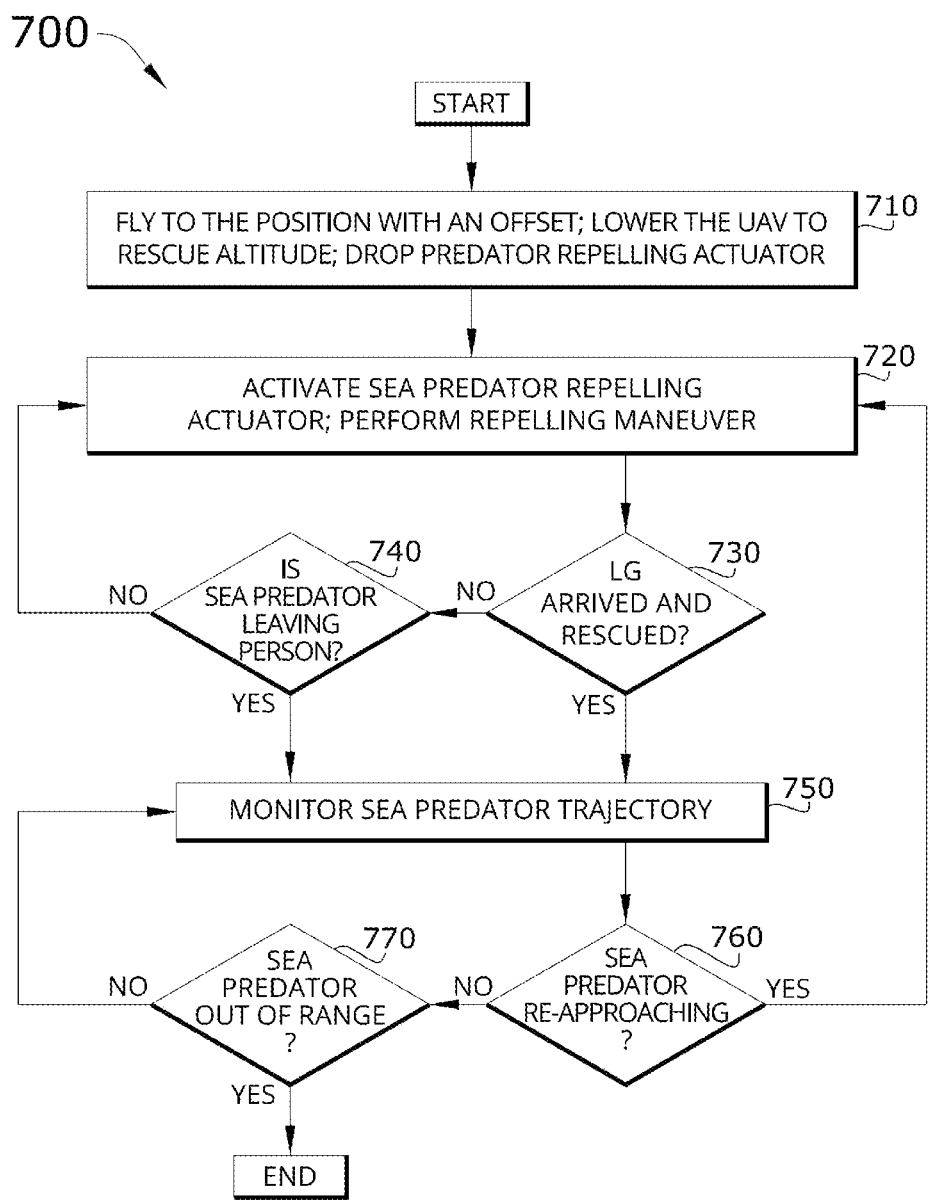
FIG. 7 conceptually illustrates a detailed sea predator rescue operation process in some embodiments.

By way of example, FIG. 7 conceptually illustrates a detailed sea predator rescue operation process 700. The detailed sea predator rescue operation process 700 is performed by the automated UAV open water beachfront hazard recognition, warning, and rescue program running on an AI mission computer in connection with a flight controller of a UAV engaged in an automated scout mission of a beachfront area. As shown in this figure, the detailed sea predator rescue operation process 700 starts by maneuvering the UAV into a position to rescue the person from the sea predator (at 710) by flying to the position of the person/sea predator with an offset, lowering the UAV to a suitable rescue altitude, and dropping a predator repelling actuator into the water nearby the sea predator and person being rescued.

In some embodiments, the detailed sea predator rescue operation process 700 moves forward to a step for activating the sea predator repelling actuator and performing a repelling operation/maneuver (at 720). For example, activating an ultrasound sensor device, activating a strong magnetic field, etc. Next, the detailed sea predator rescue operation process 700 determines (at 730) whether a lifeguard has arrived at the location of the person/sea predator and whether the person has been rescued. When the lifeguard has arrived and the person has been determined (at 730) to have been rescued ('YES'), the detailed sea predator rescue operation process 700 proceeds forward to a step for monitoring a trajectory of movement by the sea predator (at 750). However, when the lifeguard has not arrived to rescue the person ('NO'), then the detailed sea predator rescue operation process 700 determines (at 740) whether the sea predator is leaving the person or not, as may occur by the repelling operation/maneuver (at 720). When it has been determined (at 740) that the sea predator is leaving the person, the detailed sea predator rescue operation process 700 performs the step for monitoring the trajectory of movement by the sea predator (at 750). On the other hand, when the sea predator has not been determined (at 740) to be leaving the person, then the detailed sea predator rescue operation process 700 returns to the step for activating the sea predator repelling actuator and performing the repelling operation/maneuver (at 720), as described above.

In some embodiments, the detailed sea predator rescue operation process 700 performs the step for monitoring the trajectory of movement by the sea predator (at 750), as noted above. This is done to ensure that the sea predator does not present a risk of danger to anyone else in the open water anywhere within the beachfront area. For example, the sea predator may follow a trajectory that appears to be away from people in the water, but may remain within a range of danger to continue monitoring the sea predator location. Next, based on the monitoring of the sea predator's trajectory, the detailed sea predator rescue operation process 700 determines (at 760) whether the sea predator is re-approaching the area or not. When the sea predator is determined (at 760) to be re-approaching ('YES'), the detailed sea predator rescue operation process 700 returns to the step for activating the sea predator repelling actuator and performing the repelling operation/maneuver (at 720), and continuing forward as described above. However, when the sea predator is not re-approaching ('NO'), the detailed sea predator rescue operation process 700 proceeds to a step for determining (at 770) whether the sea predator is out of range or not. When the sea predator is not out of range ('NO'), the detailed sea predator rescue operation process 700 transitions back to the step for monitoring the trajectory of movement by the sea predator (at 750) and continuing forward in the manner noted above. On the other hand, when the search predator is affirmatively determined (at 770) to be out of range ('YES'), then the detailed sea predator rescue operation process 700 ends.

Figure 8:
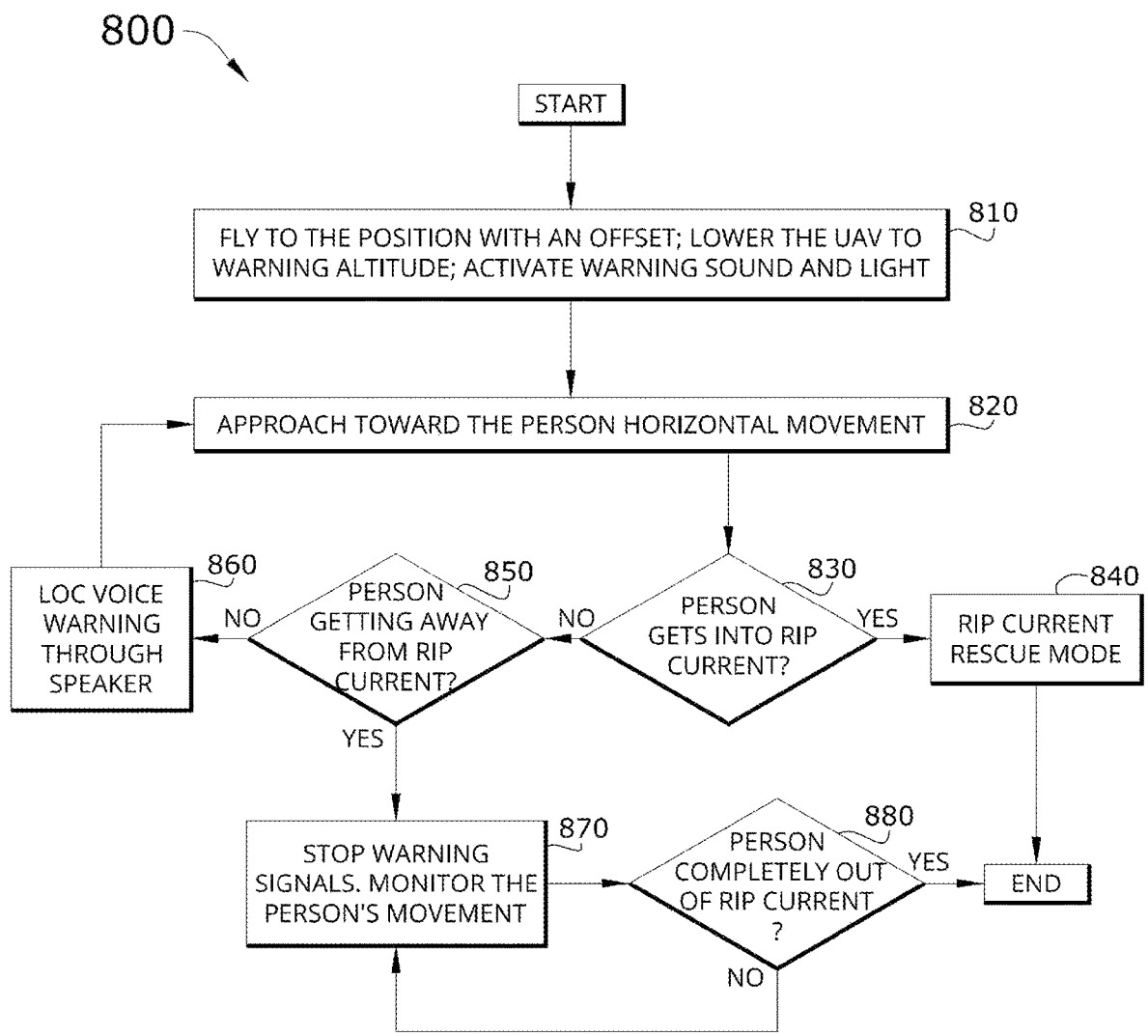
FIG. 8 conceptually illustrates a detailed rip current warning process in some embodiments.

By way of example, FIG. 8 conceptually illustrates a detailed rip current warning process 800. The detailed rip current warning process 800 is performed by the automated UAV open water beachfront hazard recognition, warning, and rescue program running on an AI mission computer in connection with a flight controller of a UAV engaged in an automated scout mission of a beachfront area. As shown in this figure, the detailed rip current warning process 800 starts by flying the UAV into a warning position with an offset, lowering the UAV to a warning altitude, and activating the warning sound and/or light (at 810). For example, emitting an audible alarm through the speaker of the UAV and flashing the strobe light of the UAV in a direction toward the person who happens to be too close to a dangerous rip current. Next, the detailed rip current warning process 800 approaches toward the person in a horizontal movement (at 820). Then the detailed rip current warning process 800 determines (at 830) whether the person is getting into the rip current or not. When the person is affirmatively determined (at 830) to be getting into the rip current, the detailed rip current warning process 800 immediately triggers a rip current rescue mode (at 840) for the UAV to perform the rip current rescue operation. An example of a detailed rip current rescue operation process is described above, by reference to FIG. 6.

Turning back to the determination (at 830), when the person has not entered the rip current ('NO'), the detailed rip current warning process 800 moves on to another step for determining (at 850) whether the person is moving away or otherwise getting away from the rip current. When the person is determined (at 850) not to be getting away from the rip current, the detailed rip current warning process 800 triggers the lifeguard operation center to give a voice warning through the speaker (at 860). This may be done by the operator in the operation center, for example. Then the detailed rip current warning process 800 returns to the step for approaching toward the person in a horizontal movement (at 820) and continuing forward as noted above.

However, when the person is affirmatively determined (at 850) to be getting away from the rip current, then the detailed rip current warning process 800 proceeds to a step that involves stopping the warning signals and monitoring the person's movement (at 870) to ensure that the person stays out of the rip current. Next, the detailed rip current warning process 800 determines (at 880) whether the person is completely out of the rip current or not. For example, the person may have started getting away from the rip current only to re-enter the rip current unintentionally. When the person is not determined (at 880) to be completely out of the rip current ('NO'), the detailed rip current warning process 800 returns to the step for stopping the warning signals and monitoring the person's movement (at 870) to ensure that the person stays out of the rip current. However, when the person is affirmatively determined (at 880) to be out of the rip current ('YES'), the detailed rip current warning process 800 ends.

Figure 9:
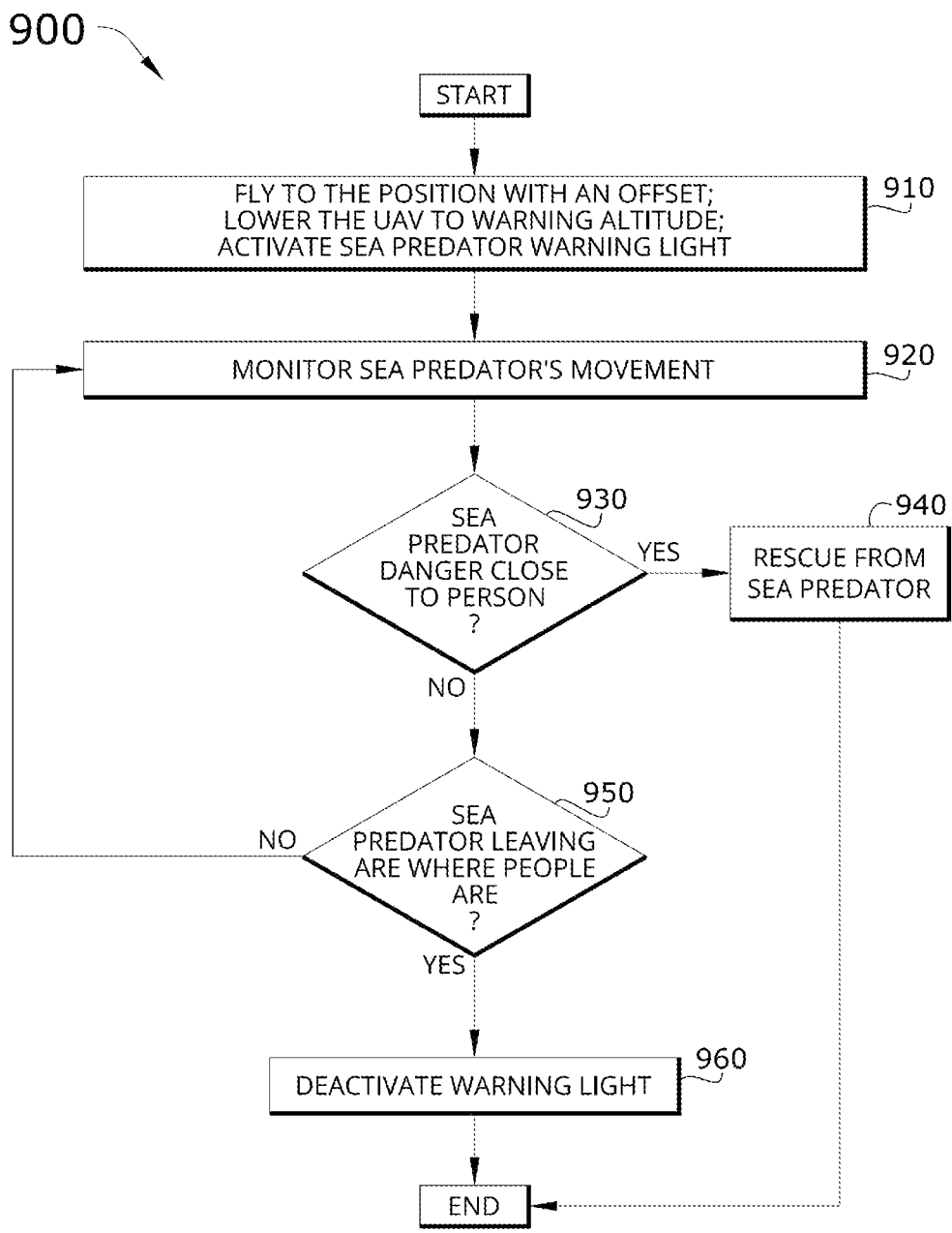
FIG. 9 conceptually illustrates a detailed sea predator warning process in some embodiments.

By way of another warning process example, FIG. 9 conceptually illustrates a detailed sea predator warning process 900. The detailed sea predator warning process 900 is performed by the automated UAV open water beachfront hazard recognition, warning, and rescue program running on an AI mission computer in connection with a flight controller of a UAV engaged in an automated scout mission of a beachfront area. As shown in this figure, the detailed sea predator warning process 900 starts by flying the UAV into a position—to warn about a sea predator—with an offset, lowering the UAV to a warning altitude, and activating a sea predator warning light (at 910). For example, activating the sea predator warning light may involve flashing the strobe light of the UAV toward the people in the open water to warn them about the nearby presence of a sea predator.

In some embodiments, the detailed sea predator warning process 900 proceeds to a step for monitoring the sea predator's movement (at 920). For example, the UAV monitors the sea predator's movement within the beachfront area of the sea/ocean in real time so as to ensure that the warnings are made timely and to the right people in the water (which, of course, may be all people in the water if the predator is a fast-moving dangerous predator, such as a shark, but may be only some of the people in the water when the predator is slow-moving, such as a jellyfish).

In some embodiments, the detailed sea predator warning process 900 then determines (at 930) whether the sea predator danger is close to a person in the water or not. This is relative determination, since a fast-moving sea predator need not be as physically close to the person as a slow-moving sea predator, given their relative speed in moving through the water. In any event, when the sea predator danger is determined (at 930) to be close to the person ('YES'), the detailed sea predator warning process 900 triggers the sea predator rescue mode to rescue the person from the sea predator (at 940). An example of a detailed sea predator rescue operation process is described above, by reference to FIG. 7.

Turning back to the determination (at 930), when the sea predator danger is not close to the person ('NO'), the detailed sea predator warning process 900 then determines (at 950) whether the sea predator is leaving the area where the people in the water are located. When the sea predator is not determined (at 950) to be leaving the area where the people in the water are located ('NO'), then the detailed sea predator warning process 900 returns to the step for monitoring the sea predator's movement (at 920), and continues forward as noted above. However, when the sea predator is affirmatively determined (at 950) to be leaving the area where the people in the water are located ('YES'), the detailed sea predator warning process 900 then deactivates the warning light (at 960) and the detailed sea predator warning process 900 ends.

Figure 10:
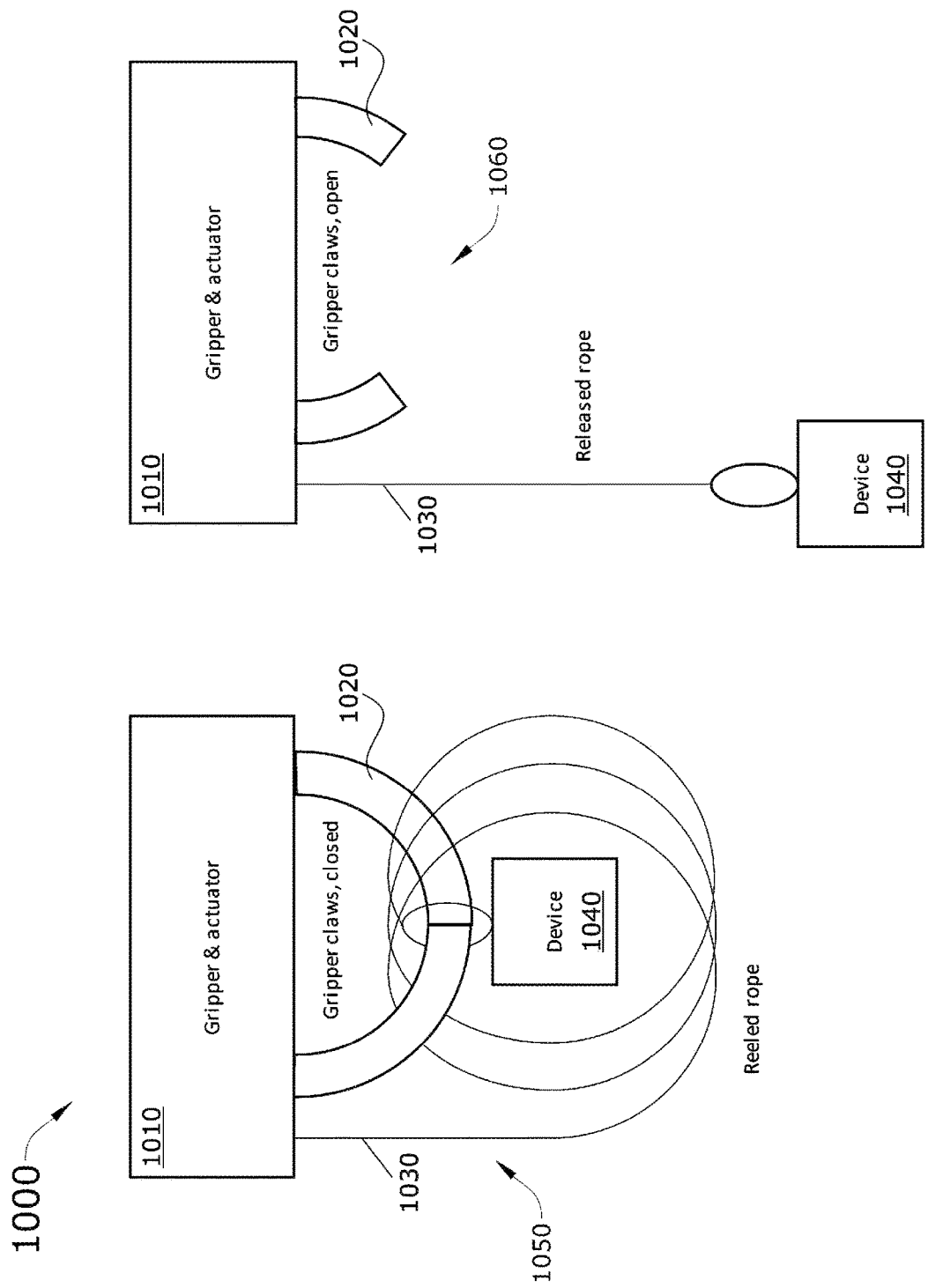
FIG. 10 conceptually illustrates a gripper connector assembly in some embodiments.

By way of example, FIG. 10 conceptually illustrates a gripper connector assembly 1000. The gripper connector assembly 1000 shown in this figure includes a gripper assembly base actuator 1010 and gripper claws 1020. The gripper connector assembly 1000 is attached directly to the UAV. A rope 1030 is attached to the gripper connector assembly 1000. The rope 1030 holds a device 1040. The device 1040 may be a floatation device (FD), an inflatable floatation device (IFD), a sea predatory repeller device, or another device. The gripper connector assembly 1000 is shown in different actuated configurations, namely, a closed configuration 1050 and an open configuration 1060. When the gripper connector assembly 1000 is in the closed configuration 1050, the device 1040 is held close to the UAV because the gripper claws 1020 are closed on each other with the rope 1030 reeled around the closed gripper claws 1020. By contrast, when the gripper connector assembly 1000 is in the open configuration 1060, the gripper claws 1020 have opened and the device 1040 has been released to fall down to the water or near the water, with only the rope 1030 connection maintaining the connection between the device 1040 and the UAV.

Figure 11:
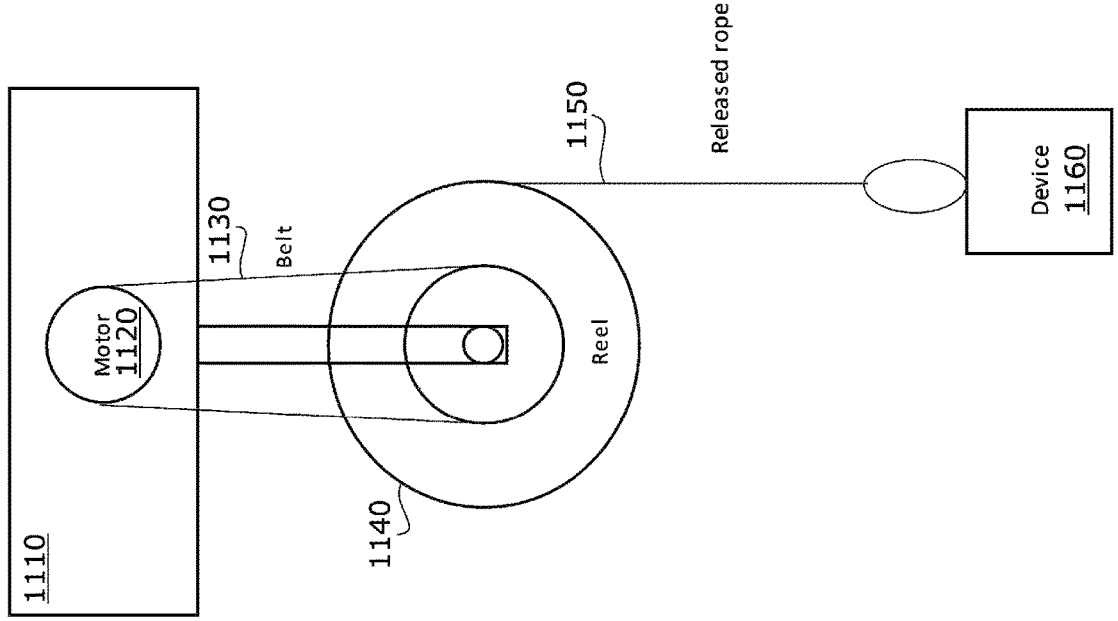
FIG. 11 conceptually illustrates a reel connector assembly in some embodiments.
Figure 11:
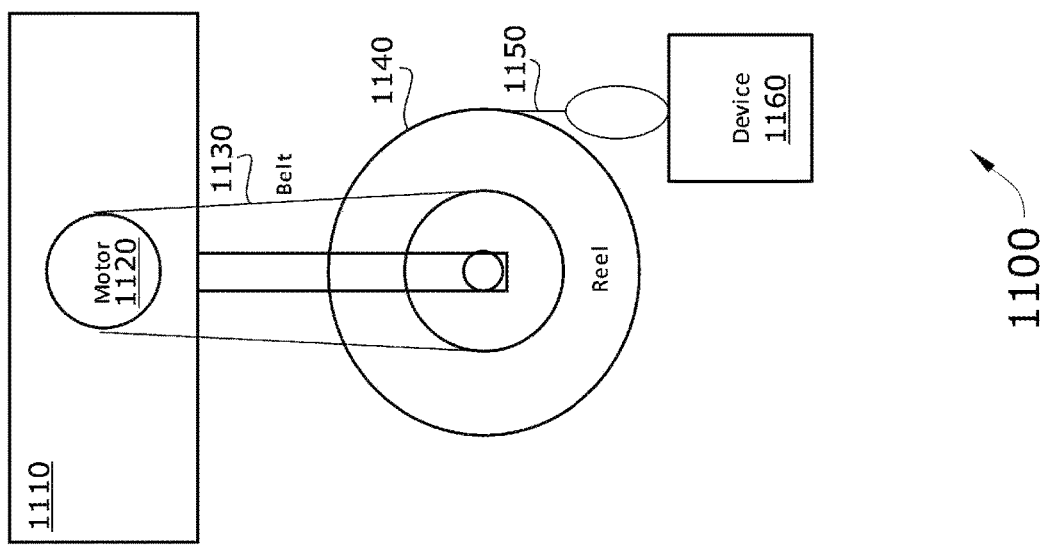

By way of example, FIG. 11 conceptually illustrates a reel connector assembly 1100. The reel connector assembly 1100 is shown in this figure includes a reel assembly base mount 1110, a reel motor 1120, a belt 1130, and a reel 1140. The reel connector assembly 1100 is attached directly to the UAV. A rope 1150 is attached to the reel 1140. The rope 1150 holds a device 1160. The device 1160 may be a floatation device (FD), an inflatable floatation device (IFD), a sea predatory repeller device, or another device. The reel 1140 is configured to wind up the rope 1150 by rotating when actuated by the motor 1120. The reel 1140 is also configured to unwind the rope 1150 when needed to release the device 1160 down to the water or near the water. The belt 1130 drives the rotation of the reel 1140 when the motor 1120 operates. The motor 1120 is configured to operate in two directions—a forward release rotation direction to release the rope 1150 and device 1160 and a back retract rotation direction to wind up the rope 1150 and device 1160.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

In this specification, "a" and "an" and similar phrases are to be interpreted as "at least one" and "one or more." References to "a", "an", and "one" are not to be interpreted as "only one". In this specification, the term "may" is to be interpreted as "may, for example." In other words, the term "may" is indicative that the phrase following the term "may" is an example of one of a multitude of suitable possibilities that may, or may not, be employed to one or more of the various embodiments. In this specification, the phrase "based on" is indicative that the phrase following the term "based on" is an example of one of a multitude of suitable possibilities that may, or may not, be employed to one or more of the various embodiments. References to "an" embodiment in this disclosure are not necessarily to the same embodiment.

Many of the elements described in the disclosed embodiments may be implemented as operations. An operation is defined here as an element which, in isolation, performs a defined function and has a defined interface to other elements. The operations described in this disclosure may be implemented in hardware, a combination of hardware and software, firmware, or a combination of hardware, software, and firmware. For example, operations may be implemented using computer hardware in combination with software routine(s) written in a computer language (for example, Java, Python, MATLAB, C, C++, Objective-C, Perl, Rust, or the like). Additionally, it may be possible to implement operations using physical hardware that incorporates discrete or programmable analog, digital, and/or quantum hardware. Examples of programmable hardware include computers, microcontrollers, microprocessors, application-specific integrated circuits (ASICs), field programmable gate arrays (FPGAs), and complex programmable logic devices (CPLDs). Computers, microcontrollers, and microprocessors are programmed using languages such as assembly, C, C++, or the like. FPGAs, ASICs, and CPLDs are often programmed using hardware description languages (HDL), such as very high speed integrated circuit (VHSIC) hardware description language (VHDL) or Verilog, that configure connections between internal hardware operations with lesser functionality on a programmable device. Finally, it needs to be emphasized that the above-mentioned technologies may be used in combination to achieve the result of a functional operation. Automatic operations are performed automatically and do not require human intervention to complete once executed. Automatic as defined herein does not include any time limitations unless otherwise noted.

Some embodiments may employ processing hardware. Processing hardware may include one or more processors, computer equipment, embedded systems, machines, and/or the like. The processing hardware may be configured to execute instructions. The instructions may be stored on a machine-readable medium. According to some embodiments, the machine-readable medium may be a medium configured to store data in a machine-readable format that may be accessed by an automated sensing device. Examples of machine-readable media include flash memory, memory cards, electrically erasable programmable read-only memory (EEPROM), solid state drives, optical disks, barcodes, magnetic ink characters, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described exemplary embodiments. Additionally, it should be noted that, for example purposes, several of the various embodiments were described as comprising operations and/or operational modes. However, one skilled in the art will recognize that many various languages and frameworks may be employed to build and use embodiments of the present invention.

In this specification, various embodiments are disclosed. Limitations, features, and/or elements from the disclosed example embodiments may be combined to create further embodiments within the scope of the disclosure. Moreover, the scope includes any and all embodiments having equivalent elements, modifications, omissions, adaptations, or alterations based on the present disclosure. Further, aspects of the disclosed processes can be modified in any manner, including by reordering aspects, or inserting or deleting aspects.

In addition, it should be understood that any figures that highlight any functionality and/or advantages, are presented for example purposes only. The disclosed architecture is sufficiently flexible and configurable, such that it may be utilized in ways other than that described and/or shown. For example, the steps listed in any flowchart for any process or method may be re-ordered or only optionally used in some embodiments.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in eight different ways, namely, with none of the three possible features, with just one of the three possible features, with any two of the three possible features, or with all three of the three possible features.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

I claim:

1. An automated UAV open water beachfront hazard recognition, warning, and rescue system comprising:
an unmanned aerial vehicle (UAV) that is configured to perform an autonomous scout operation associated with a flight path covering a beachfront area and an open water area under life guard watch and detect hazards to humans in the open water area, the UAV comprising (i) a flight controller & AI mission computer, (ii) a gyroscope connected to the flight controller & AI mission computer, (iii) a GPS receiver connected to the flight controller & AI mission computer, (iv) an electronic speed controller (ESC) connected to the flight controller & AI mission computer, (v) a thrust and flight actuator connected to and controlled by the ESC, (vi) a propeller connected to and controlled by the thrust and flight actuator, (vii) a camera connected to the flight controller & AI mission computer and configured to capture UAV video and audio data, (viii) a UAV data communications radio connected to the flight controller & AI mission computer and configured to wirelessly transmit the UAV video and audio data to a related data communications radio, (ix) a sensor connector attached to an exterior surface of the UAV, (x) an ultrasonic sensor physically connected to the sensor connector and communicably connected to the flight controller & AI mission computer, (xi) a repeller connector attached to the exterior surface of the UAV, (xii)

an animal repeller device that is physically connected to the repeller connector, communicably connected to the flight controller & AI mission computer, and configured to deter a sea predator when a shark is detected in the open water area, wherein the animal repeller device comprises one of an ultrasound actuator that emits sound sensations toward the detected shark and a magnetic field actuator that emits a magnetic field toward the detected shark, (xiii) a floatation device connector attached to the exterior surface of the UAV, (xiv) a floatation device physically connected to the floatation device connector and communicably connected to the flight controller & AI mission computer, (xv) a rope connector attached to the exterior surface of the UAV, (xvi) a rope physically connected to the rope connector and communicably connected to the flight controller & AI mission computer, (xvii) a light strobe physically attached to the exterior surface of the UAV, communicably connected to the flight controller & AI mission computer, and configured to emit strobe pulses of light as a visual warning to humans in the beachfront area when a particular ocean hazard is detected in the open water area, (xviii) a speaker with microphone physically attached to the exterior surface of the UAV, communicably connected to the flight controller & AI mission computer, and configured to audibly warn humans in the open water area and in the beachfront area when the particular ocean hazard is detected, and (xix) an onboard battery, wherein the particular ocean hazard comprises one of a rip current detected in the open water area, a sea animal detected in the open water area, and high crashing waves detected in the open water area;

a ground operation data communications radio at an operation center at a beach location nearby the beachfront area and the open water area under lifeguard watch, wherein the ground operation data communications radio communicably connects to the UAV data communications radio and receives UAV video and audio data from the UAV during the autonomous scout operation performed by the UAV over the beachfront area and the open water area;

a ground operation computing device that is configured to operate at the operation center in connection with the UAV, wherein the ground operation computing device is configured to receive and process the UAV video and audio data from the ground operation data communications radio; and a battery charger at the operation center that is configured to recharge the onboard battery of the UAV when the UAV maneuvers to a location of the battery charger.

2. The automated UAV open water beachfront hazard recognition, warning, and rescue system of claim 1, wherein the connector for one or more of the sensor connector, the repeller connector, the floatation device connector, and the rope connector comprises a gripper connector assembly.

3. The automated UAV open water beachfront hazard recognition, warning, and rescue system of claim 2, wherein the gripper connector assembly comprises a gripper assembly base, an actuator, and gripper claws.

4. The automated UAV open water beachfront hazard recognition, warning, and rescue system of claim 1, wherein the connector for one or more of the sensor connector, the repeller connector, the floatation device connector, and the rope connector comprises a reel connector assembly.

5. The automated UAV open water beachfront hazard recognition, warning, and rescue system of claim 4, wherein the reel connector assembly comprises a reel assembly base, a motor, a reel, and a belt that wraps around the motor and the reel and is configured to rotate the reel when the motor operates.

6. The automated UAV open water beachfront hazard recognition, warning, and rescue system of claim 5, wherein a reel rope attached to the exterior surface of the UAV is positioned nearby the reel connector assembly, wherein the floatation device attaches to a distal end of the reel rope, wherein the reel is configured to rotate in an unwind direction to unwind the reel rope when the motor operates in a first operational direction to lower the floatation device down to a person in danger in the open water area as the UAV hovers above the person in danger, wherein the reel is configured to rotate in a retract direction to retract the reel rope when the motor operates in a second operational direction that is opposite the first operational direction to wind up the reel rope around the reel.

7. The automated UAV open water beachfront hazard recognition, warning, and rescue system of claim 1, wherein the camera comprises one of (i) a fixed focal length camera attached to the exterior surface of the UAV and (ii) a camera gimbal with zoom lens attached to the exterior surface of the UAV.

8. The automated UAV open water beachfront hazard recognition, warning, and rescue system of claim 1, wherein the flight controller & AI mission computer comprises an embedded AI mission computer with a central processing unit (CPU), a memory, a storage, a graphics processing unit (GPU), and an AI engine that implements AI and machine learning algorithms to provide real-time, in-flight AI processing in a plurality of modes comprising a rip current rescue mode, a rip current warning mode, a sea predator rescue mode, and a sea predator warning mode.

9. The automated UAV open water beachfront hazard recognition, warning, and rescue system of claim 1, wherein the flight controller & AI mission computer further comprises a flight controller device, wherein the flight controller device and the AI mission computing device are separate embedded components of the flight controller & AI mission computer.

10. The automated UAV open water beachfront hazard recognition, warning, and rescue system of claim 9, wherein the flight controller device provides serial input/output (I/O) communication with the gyroscope, the GPS receiver, the ESC, the thrust and flight actuator, the sensor connector, the repeller connector, the floatation device connector, the rope connector, the ultrasonic sensor, the animal repeller device, the light strobe, and the speaker with microphone.

11. The automated UAV open water beachfront hazard recognition, warning, and rescue system of claim 10, wherein the UAV further comprises a rotor and arm actuator that is communicably connected to the flight controller device and the propeller.

12. The automated UAV open water beachfront hazard recognition, warning, and rescue system of claim 10, wherein the camera is communicably connected to the AI mission computing device, wherein the UAV data communications radio is communicably connected to the AI mission computing device.

13. The automated UAV open water beachfront hazard recognition, warning, and rescue system of claim 12, wherein the UAV further comprises:

a remote control (RC) radio communicably connected to the flight controller device and configured to wirelessly receive from a ground operation RC radio at the operation center, remote UAV operation commands that alter the flight path;

a telemetry radio communicably connected to the flight controller device and configured to wirelessly transmit telemetry data captured by the UAV to a ground telemetry radio at the operation center; and a cellular radio communicably connected to the AI mission computing device.

14. The automated UAV open water beachfront hazard recognition, warning, and rescue system of claim 13, wherein the ground operation RC radio is connected to a ground operation RC joystick that is configured for human interaction by an operator to remotely control maneuvering of the UAV in a way that alters the flight path of the UAV over the open water area.

15. The automated UAV open water beachfront hazard recognition, warning, and rescue system of claim 13, wherein the AI mission computing device is configured to assess a particular hazard detected in the open water area and determine whether the particular hazard is an emergency situation, wherein the AI mission computing device is further configured to utilize the cellular radio of the UAV to call emergency services when the particular hazard is determined to be the emergency situation.

16. The automated UAV open water beachfront hazard recognition, warning, and rescue system of claim 13, wherein the ground operation computing device is configured to receive and process the telemetry data from the ground telemetry radio, wherein the ground operation computing device is configured to automatically detect an emergency situation in the open water area after processing (i) the telemetry data received from the ground telemetry radio and (ii) the UAV video and audio data captured by the camera of the UAV and transmitted by the UAV data communications radio to the ground operation data communications radio, wherein the ground operation computing device is further configured to trigger a direct dial emergency system at the operation center to automatically call emergency services when the emergency situation in the open water area is detected.

* * * * *